(12) United States Patent
Bhamri et al.

(10) Patent No.: US 12,273,189 B2
(45) Date of Patent: Apr. 8, 2025

(54) INDICATING A RESOURCE SET FOR UPLINK REPETITION

(71) Applicant: Lenovo (Singapore) Pte. Ltd., New Tech Park (SG)

(72) Inventors: Ankit Bhamri, Rödermark (DE); Vijay Nangia, Woodridge, IL (US); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/261,810

(22) PCT Filed: Jan. 13, 2022

(86) PCT No.: PCT/IB2022/050277
§ 371 (c)(1),
(2) Date: Jul. 17, 2023

(87) PCT Pub. No.: WO2022/153221
PCT Pub. Date: Jul. 21, 2022

(65) Prior Publication Data
US 2024/0089026 A1 Mar. 14, 2024

Related U.S. Application Data

(60) Provisional application No. 63/138,277, filed on Jan. 15, 2021.

(51) Int. Cl.
*H04L 1/00* (2006.01)
*H04L 5/00* (2006.01)
*H04W 72/1268* (2023.01)

(52) U.S. Cl.
CPC .......... *H04L 1/0013* (2013.01); *H04L 1/0072* (2013.01); *H04L 5/0053* (2013.01); *H04L 5/0094* (2013.01); *H04W 72/1268* (2013.01)

(58) Field of Classification Search
None
See application file for complete search history.

(56) References Cited

U.S. PATENT DOCUMENTS

2020/0154427 A1 5/2020 Choi et al.
2020/0383105 A1 12/2020 Park et al.
(Continued)

FOREIGN PATENT DOCUMENTS

| EP | 3684123 A1 | 9/2018 |
|---|---|---|
| WO | 2019159300 A1 | 8/2019 |
| WO | 2020222625 A1 | 11/2020 |

OTHER PUBLICATIONS

T.-K. Le, U. Salim and F. Kaltenberger, "An Overview of Physical Layer Design for Ultra-Reliable Low-Latency Communications in 3GPP Releases 15, 16, and 17," in IEEE Access, vol. 9, pp. 433-444, 2021 (Year: 2021).*

(Continued)

*Primary Examiner* — Daniel F. McMahon
(74) *Attorney, Agent, or Firm* — Kunzler Bean & Adamson

(57) ABSTRACT

Apparatuses, methods, and systems are disclosed for enhanced UL repetition indication and repetition procedure provides one or more signaling mechanisms to support dynamic PUCCH repetition factor indication. A User Equipment apparatus includes a transceiver and a processor that receives from a network, a Radio Resource Control ("RRC") configuration for one or more physical uplink control channel ("PUCCH") resources sets and corresponding one or more PUCCH resource configurations for each of the configured PUCCH resource sets, where one or more of the corresponding PUCCH resource configurations indicate a number of slots over which PUCCH can be repeated and receives from the network a downlink control information ("DCI"), where the DCI includes a PUCCH resource indi-
(Continued)

cator ("PRI") to indicate one of a RRC configured PUCCH resources within a PUCCH resource set and a corresponding number of slots for PUCCH repetition.

20 Claims, 9 Drawing Sheets

(56) References Cited

U.S. PATENT DOCUMENTS

| | | | | |
|---|---|---|---|---|
| 2022/0030606 | A1* | 1/2022 | Xiong | H04W 52/242 |
| 2022/0095346 | A1* | 3/2022 | Khoshnevisan | H04L 1/1858 |
| 2022/0311545 | A1* | 9/2022 | Sun | H04W 72/21 |
| 2023/0292294 | A1* | 9/2023 | Rudolf | H04L 1/1858 |
| 2023/0345465 | A1* | 10/2023 | Fakoorian | H04W 72/20 |

OTHER PUBLICATIONS

PCT/IB2022/050277, "Notification of Transmittal of the International Search Report and the Written Opinion of the International Searching Authority, or the Declaration", International Searching Authority, Apr. 19, 2022, pp. 1-14.
Huawei et al., "Potential solutions for PUSCH coverage enhancement", 3GPP TSG RAN WG1 Meeting #103-e R1-2007583, Oct. 26-Nov. 13, 2020, pp. 1-11.
ZTE Corp., "Discussion on potential techniques for PUSCH", 3GPP TSG RAN WG1 #103-e R1-2007743, Oct. 26-Nov. 13, 2020, pp. 1-12.
Sierra Wireless, "Potential techniques for NR coverage enhancements", 3GPP TSG RAN WG1 #103-e R1-2007930, Oct. 26-Nov. 13, 2020, pp. 1-11.
Intel Corp., "On potential techniques for PUSCH coverage enhancement", 3GPP TSG RAN WG1 #103-e R1-2007954, Oct. 26-Nov. 13, 2020, pp. 1-11.
Apple Inc., "On potential techniques for PUSCH coverage enhancement", 3GPP TSG RAN WG1#103 R1-2008479, Oct. 26-Nov. 13, 2020, pp. 1-5.
NTT Docomo, Inc., "Baseline coverage performance for FR1", 3GPP TSG RAN WG1 #103e R1-2008557, Oct. 26-Nov. 13, 2020, pp. 1-6.
China Telecom, "Discussion on PUSCH coverage enhancements", 3GPP TSG RAN WG1 #103-e R1-2008874, Oct. 26-Nov. 13, 2020, pp. 1-12.
3GPP, "3rd Generation Partnership Project; Technical Specification Group Radio Access Network; Study on NR coverage enhancements (Release 17)", 3GPP TR 38.830 V17.0.0, Dec. 2020, pp. 1-91.
3GPP, "3rd Generation Partnership Project; Technical Specification Group Radio Access Network; Physical layer procedures for shared spectrum channel access (Release 16)", 3GPP TS 37.213 V16.3.0, Sep. 2020, pp. 1-26.
3GPP, "3rd Generation Partnership Project; Technical Specification Group Radio Access Network; NR; Physical channels and modulation (Release 16)", 3GPP TS 38.211 V16.3.0, Sep. 2020, pp. 1-133.
3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.
3GPP, "3rd Generation Partnership Project; Technical Specification Group Radio Access Network; NR; Physical layer procedures for control (Release 16)", 3GPP TS 38.213 V16.3.0, Sep. 2020, pp. 1-179.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

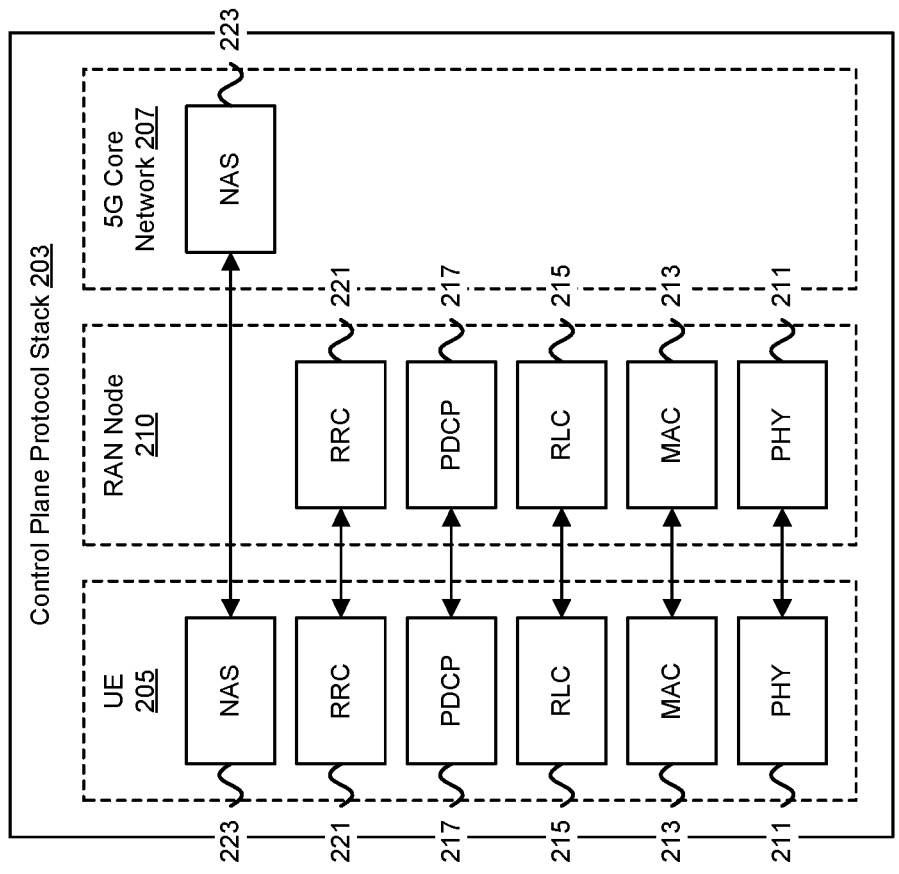
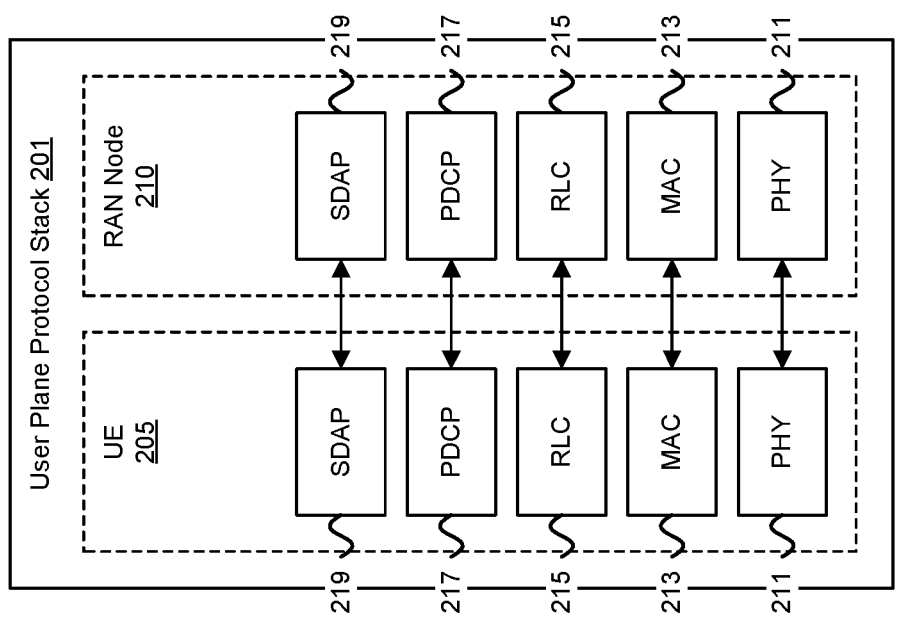
FIG. 2

Table 300: Illustration of enhanced TDRA with enhanced type A

| Row Index | PUSCH mapping type | $K_2$ | S | L | Number of Repetitions |
|---|---|---|---|---|---|
| 1 | Type A | j | 0 | 14 | 2 |
| 2 | Type A | j | 0 | 4 | 16 |
| 3 | Type A | j | 0 | 10 | 4 |
| 4 | Type B | j | 2 | 10 | 1 |
| 5 | Type B | j | 4 | 4 | 8 |
| 6 | Type B | j | 4 | 8 | 2 |
| 7 | Type B | j | 4 | 6 | 4 |
| 8 | Type A | j+1 | 0 | 2 | 32 |
| 9 | Type B | j+1 | 2 | 4 | 20 |
| 10 | Type A | j+1 | 0 | 10 | 1 |
| 11 | Type A | j+2 | 0 | 4 | 16 |
| 12 | Type A | j+2 | 0 | 12 | 1 |
| 13 | Type A | j+2 | 0 | 10 | 1 |
| 14 | Type B | j | 8 | 6 | 2 |
| 15 | Type A | j+3 | 0 | 14 | 8 |
| 16 | Type A | j+3 | 0 | 10 | 2 |

Row 2 → Enh-Type A indicates up to 16 repetitions (actual)

Row 9 → Current Type A with 20 repetitions (not actual since more than 16)

Row 15 → Enh-Type A with 8 repetitions (actual since less than 16)

FIG. 3

Table 400: Dynamic repetition indication with PRI table

| PUCCH resource indicator 404 | | | PUCCH resource 402 | Repetition Factor 406 |
|---|---|---|---|---|
| 1 bit | 2 bits | 3 bits | | |
| '0' | '00' | '000' | 1st PUCCH resource provided by pucch-ResourceId obtained from the 1st value of resourceList | 2 |
| '1' | '01' | '001' | 2nd PUCCH resource provided by pucch-ResourceId obtained from the 2nd value of resourceList | 2 |
| | '10' | '010' | 3rd PUCCH resource provided by pucch-ResourceId obtained from the 3rd value of resourceList | 2 |
| | '11' | '011' | 4th PUCCH resource provided by pucch-ResourceId obtained from the 4th value of resourceList | 3 |
| | | '100' | 5th PUCCH resource provided by pucch-ResourceId obtained from the 5th value of resourceList | 8 |
| | | '101' | 6th PUCCH resource provided by pucch-ResourceId obtained from the 6th value of resourceList | 4 |
| | | '110' | 7th PUCCH resource provided by pucch-ResourceId obtained from the 7th value of resourceList | 8 |
| | | '111' | 8th PUCCH resource provided by pucch-ResourceId obtained from the 8th value of resourceList | 2 |

FIG. 4

INDICATING A RESOURCE SET FOR UPLINK REPETITION

CROSS-REFERENCE TO RELATED APPLICATIONS

This application claims priority to U.S. Provisional Patent Application No. 63/138,277 titled "ENHANCED UL REPETITION INDICATION AND REPETITION PROCEDURE FOR COVERAGE" and filed on Jan. 15, 2021 for Ankit Bhamri, which is incorporated herein by reference.

FIELD

The subject matter disclosed herein relates generally to wireless communications and more particularly relates to signaling enhancements for enhanced uplink repetition indication and repetition procedure for coverage.

BACKGROUND

In various wireless communication systems, a User Equipment device ("UE") is able to connect with a fifth-generation ("5G") core network (i.e., "5GC") in a Public Land Mobile Network ("PLMN"). In wireless networks, certain coverage requirements cannot be satisfied with the current slot-based repetition scheme such as for example Physical Uplink Shared Channel ("PUCCH") repetition type A where multiple repetitions are scheduled on consecutive multiple slots and/or for multiple Physical Uplink Control Channel ("PUCCH") repetitions.

BRIEF SUMMARY

Disclosed are procedures for enhanced uplink ("UL") repetition indication and repetition procedure for coverage enhancement. Said procedures may be implemented by apparatus, systems, methods, and/or computer program products.

One method of a User Equipment device ("UE") includes receiving from a network a Radio Resource Control ("RRC") configuration for one or more Physical Uplink Control Channel ("PUCCH") resources sets and corresponding one or more PUCCH resource configurations for each of the configured PUCCH resource sets, wherein one or more of the corresponding PUCCH resource configurations indicate a number of slots over which PUCCH can be repeated and receiving from the network a Downlink Control Information ("DCI"), where the DCI includes a PUCCH resource indicator ("PRI") to indicate one of a RRC configured PUCCH resources within a PUCCH resource set and a corresponding number of slots for PUCCH repetition.

One method of a network in a mobile communication network includes transmitting to a User Equipment ("UE") a Radio Resource Control ("RRC") configuration for one or more physical uplink control channel ("PUCCH") resources sets and corresponding one or more PUCCH resource configurations for each of the configured PUCCH resource sets, wherein one or more of the corresponding PUCCH resource configurations indicate a number of slots over which PUCCH can be repeated and transmitting a Downlink Control Information ("DCI"), wherein the DCI includes a PUCCH Resource Indicator ("PRI") to indicate one of a RRC configured PUCCH resources within a PUCCH resource set and a corresponding number of slots for PUCCH repetition.

BRIEF DESCRIPTION OF THE DRAWINGS

A more particular description of the examples briefly described above will be rendered by reference to specific examples that are illustrated in the appended drawings. Understanding that these drawings depict only some examples and are not therefore to be considered to be limiting of scope, the examples will be described and explained with additional specificity and detail through the use of the accompanying drawings, in which:

FIG. 2 is a block diagram illustrating a New Radio ("NR") protocol stack, in accordance with one or more examples of the present disclosure;

FIG. 3 is a diagram illustrating an enhanced TDRA table with enhanced PUSCH mapping type A, in accordance with one or more examples of the present disclosure;

FIG. 4 is a diagram illustrating a table for dynamic repetition indication with PRI, in accordance with one or more examples of the present disclosure;

DETAILED DESCRIPTION

Figure 1:
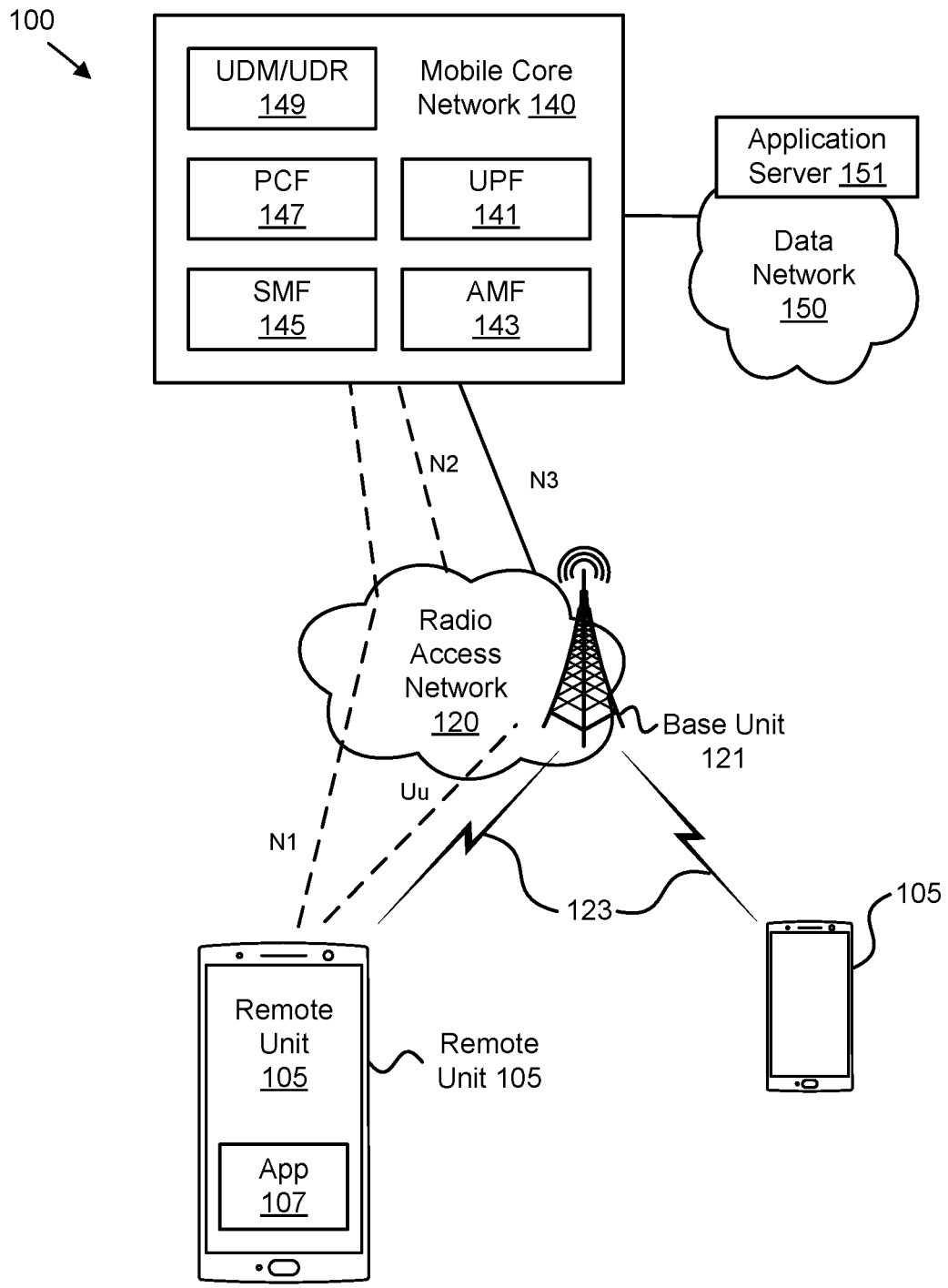
FIG. 1 is a block diagram illustrating a wireless communication system for enhanced UL repetition indication and repetition procedure for coverage, in accordance with one or more examples of the present disclosure.

As will be appreciated by one skilled in the art, aspects of the examples may be implemented as a system, apparatus, method, or program product. Accordingly, examples may take the form of an entirely hardware implementation, an entirely software implementation (including firmware, resident software, micro-code, etc.) or an implementation combining software and hardware aspects.

For example, the disclosed implementations may be implemented as a hardware circuit comprising custom very-large-scale integration ("VLSI") circuits or gate arrays, off-the-shelf semiconductors such as logic chips, transistors, or other discrete components. The disclosed implementations may also be implemented in programmable hardware devices such as field programmable gate arrays, programmable array logic, programmable logic devices, or the like. As another example, the disclosed implementations may include one or more physical or logical blocks of executable code which may, for instance, be organized as an object, procedure, or function.

Furthermore, implementations may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain implementation, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for implementations may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the implementations may be combined in any suitable manner. In the following description, numerous specific details are provided, such as examples of programming, software modules, user selections, network transactions, database queries, database structures, hardware modules, hardware circuits, hardware chips, etc., to provide a thorough understanding of implementations. One skilled in the relevant art will recognize, however, that implementations may be practiced without one or more of the specific details, or with other methods, components, materials, and so forth. In other instances, well-known structures, materials, or operations are not shown or described in detail to avoid obscuring aspects of an implementation.

Reference throughout this specification to "one example," "an example," or similar language means that a particular feature, structure, or characteristic described in connection with the implementation is included in at least one implementation. Thus, appearances of the phrases "in one example," "in an example," and similar language throughout this specification may, but do not necessarily, all refer to the same example, but mean "one or more but not all examples" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B, and/or C includes only A, only B, only C, a combination of A and B, a combination of B and C, a combination of A and C or a combination of A, B and C. As used herein, a list using the terminology "one or more of includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various examples. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements.

Overview

Generally, the present disclosure describes systems, methods, and apparatus for enhanced UL repetition indication and repetition procedure for coverage. In certain network systems NR coverage enhancements may be achieved through enhancements on PUSCH repetition type A to increase the maximum number of repetitions, the number of repetitions counted on the basis of available UL slots, limiting the overall duration for the total number of repetitions.

Furthermore, there is a need for specification of certain PUCCH enhancements. For example, there is a need to specify one or more signaling mechanisms to support dynamic PUCCH repetition factor indication. There is also a need to specify certain mechanisms to support Demodulation Reference Signal ("DMRS") bundling across PUCCH repetitions. In this disclosure, various PUSCH repetition enhancements for coverage and/or PUCCH repetition enhancements are presented. Regarding coverage enhancements in NR, certain the coverage requirements cannot be fully satisfied with an existing slot-based repetition scheme namely PUSCH repetition type A where multiple repetitions are scheduled on consecutive multiple slots. The actual number of repetitions are usually less than what is indicated/configured to the UE due to unavailability of UL symbols on the scheduled resources. Basically, a transmission occasion for repetition is dropped, if any of the scheduled symbols are unavailable for UL. Based on the current supported slot formats, it is quite rare that the indicated number of repetitions can actually be transmitted. Therefore, for coverage enhancements, one or more options may be specified for increasing the number of actual repetitions for PUSCH repetition type-A and/or by counting the repetitions based on actually available slots for UL. As used herein, the term "a number of" items (e.g., repetitions) refers to a predetermined or specified amount or quantity of the items and not to merely an arbitrary number that may exist.

The present disclosure addresses various issues, including the following:

Increasing the number of indicated/configured repetitions may help to also increase the number of actual repetitions, but may also result in overbooking of repetitions, especially when such configuration is done in a semi-static manner. Described herein are techniques to avoid such overbooking.

Also described here is how to configure/indicate/apply one or more options for PUSCH repetition type A.

Regarding PUSCH repetition, various enhancements for PUSCH repetition may enable better coverage:

Enhancements on PUSCH repetition type A take into account several aspects, including increasing the maximum number of repetitions, the number of repetitions counted on the basis of available UL slots and flexible symbol resource allocation in different slots Enhancements on increasing the maximum number of repetitions may impact: TDRA ("Time-Domain Resource Allocation"). Such enhancements regarding the number of repetitions counted on the basis of available UL slots may also impact TDRA, mechanisms to determine transmission occasion of actual repetitions, and mechanisms to determine whether a special slot can be determined as an available UL slot. Specification impacts of enhancements on flexible symbol resource allocation in different slots may include: TDRA and mechanisms to determine UL symbols for each slot.

In one example, a 3.2 dB (O2I) and 4 dB (O2O) signal-to-noise ratio ("SNR") gain may be observed when the actual number of repetitions is increased from 3 to 8 (counted on the basis of available UL slots) for VoIP at 2% residual Block Error Rate ("rBLER") for Frequency Range 1 ("FR1") Time Division Duplex ("TDD"), compared to Rel-16 PUSCH repetition type A with 8 nominal repetitions. Hybrid Automatic Repeat Request ("HARQ") is not used.

In some examples, a 1.0~1.5 dB SNR gain is observed for PUSCH transmission with 4 repetitions and maximum 1 retransmission (maximum 8 actual transmissions in total, redundancy version {0, 2, 3, 1}) for VoIP at 2% rBLER for FR1 TDD 4 GHz with 'DDDSUDDSUU' configured by 16 repetitions, compared to PUSCH transmission with 2 repetitions and maximum 3 retransmissions (maximum 8 actual transmissions in total, redundancy version {0, 2}).

In certain examples, a 6.8 dB SNR gain is observed, when the actual number of repetitions is increased for VoIP at 2% rBLER for FR1 TDD, compared to Rel-16 PUSCH repetition type A. HARQ is not used.

In one or more examples, a 2.0 dB SNR gain is observed, when the actual number of repetition is doubled for eMBB with the transport block size ("TBS") fixed at 136 bits at 10% initial Block Error Rate ("iBLER") for FR1 Frequency Division Duplex ("FDD"), compared to Rel-16 PUSCH repetition type A with 8 repetitions. HARQ is not used.

In some examples, a 0.8 dB SNR gain is observed with the repetition and the frequency hopping is enabled for enhanced Mobile Broadband ("eMBB") at 10% iBLER for FR1 FDD. The TBS is changed to keep the target data rate 100 kpbs for with or without repetition.

In certain examples, about a 2.0 dB SNR gain is observed when the actual number of repetitions is doubled, e.g., from 2 to 4, from 4 to 8, for eMBB at 10% iBLER for FR1 TDD. HARQ is not used. Note: the observed gain is for different data rates where the data rate is sometimes less than the required 100 kbps for the eMBB use case.

In one or more examples, about a 8.1 dB SNR gain is observed for PUSCH transmission with 3 retransmissions combined with 4 actual repetitions for Voice over Internet Protocol ("VoIP") at 2% rBLER for FR1 TDD, compared to PUSCH transmission with no repetition and no retransmission.

In some examples, when the TBS is adjusted to maintain the target data rate of 100 kbps, +0.4, +0.2, a −1.6 dB SNR gain is observed when the number of repetitions is increased to 4, 8, 16 respectively for eMBB at 10% iBLER for FR1 FDD using Rel-16 PUSCH repetition type A.

Enhancements on PUSCH repetition type B take into account several aspects, including actual PUSCH transmission across the slot boundary/invalid symbols, the length of actual repetition larger than 14 symbols, and redundancy version ("RV") enhancement. Specification impacts of enhancements on PUSCH repetition type B may include: TBS determination, Demodulation Reference Signal ("DMRS" or "DM-RS") pattern, Time-Domain Resource Allocation ("TDRA"), and/or RV determination. Note that power consistency and phase continuity may or may not be required depending on factors such as cross-slot channel estimation, etc.

Regarding PUSCH time-domain resource allocation in NR Rel-15/16, according to section 6.1.2.1 of Third Generation Partnership Project ("3GPP") Technical Specification ("TS") 38.214 V16.6.0, a following procedure for time-domain allocation for PUSCH is performed:

When the UE is scheduled to transmit a transport block and no Channel State Information ("CSI") report, or the UE is scheduled to transmit a transport block and a CSI report(s) on PUSCH by a DCI, the 'Time domain resource assignment' field value m of the DCI provides a row index m+1 to an allocated table. The determination of the used resource allocation table is defined in Clause 6.1.2.1.1 of 3GPP TS 38.214 V16.6.0. The indexed row defines the slot offset $K_2$, the Start and Length Indicator ("SLIM"), or directly the start symbol S and the allocation length L, the PUSCH mapping type, and the number of repetitions (if numberOfRepetitions is present in the resource allocation table) to be applied in the PUSCH transmission.

When the UE is scheduled to transmit a PUSCH with no transport block and with a CSI report(s) by a 'CSI request' field on a DCI, the 'Time domain resource assignment' field value m of the DCI provides a row index m+1 to the allocated table as defined in Clause 6.1.2.1.1 of 3GPP TS 38.214 V16.6.0. The indexed row defines the start and length indicator SLIV, or directly the start symbol S and the allocation length L, and the PUSCH mapping type to be applied in the PUSCH transmission and the $K_2$ value is determined as $K_2 = \max_j Y_j$ (m+1), where $Y_j$, j=0, . . . , $N_{Rep}$1−are the corresponding list entries of the higher layer parameter:
  a. reportSlotOffsetListDCI-0-2, if PUSCH is scheduled by DCI format 0_2 and reportSlotOffsetListDCI-0-2 is configured;
  b. reportSlotOffsetListDCI-0-1, if PUSCH is scheduled by DCI format 0_1 and reportSlotOffsetListDCI-0-1 is configured;
  c. reportSlotOffsetList, otherwise;

In CSI-ReportConfig for the N Rep triggered CSI Reporting Settings and $Y_j$(m+1) is the (m+1)th entry of $Y_j$. The slot $K_s$ where the UE shall transmit the PUSCH is determined by $K_2$ as $$K_s = \left\lfloor n \cdot \frac{n^{\mu_{PUSCH}}}{2^{\mu_{PDCCH}}} \right\rfloor + K_2 + \left\lfloor \left( \frac{N^{CA}_{slot,offset,PDCCH}}{2^{\mu_{offset,PDCCH}}} - \frac{N^{CA}_{slot,offset,PUSCH}}{2^{\mu_{offset,PUSCH}}} \right) \cdot 2^{\mu_{PUSCH}} \right\rfloor,$$

if UE is configured with ca-SlotOffset for at least one of the scheduled and scheduling cell, $$K_s = \left\lfloor n \cdot \frac{n^{\mu_{PUSCH}}}{2^{\mu_{PDCCH}}} \right\rfloor + K_2$$

otherwise, and where n is the slot with the scheduling DCI, $K_2$ is based on the numerology of PUSCH, and $\mu_{PUSCH}$ and $\mu_{PDCCH}$ are the subcarrier spacing configurations for PUSCH and Physical Downlink Control Channel ("PDCCH"), respectively.

$N_{slot,offset,PDCCH}^{CA}$ and $\mu_{offset,PDCCH}$ are the $N_{slot,offset}^{CA}$ and the $\mu_{offset}$, respectively, which are determined by higher-layer configured ca-SlotOffset for the cell receiving the PDCCH, $N_{slot,offset,PDCCH}$ and $\mu_{offset,PUSCH}$ are the $N_{slot,offset}^{CA}$ and the $\mu_{offset}$, respectively, which are determined by higher-layer configured ca-SlotOffset for the cell transmitting the PUSCH, as defined in clause 4.5 of 3GPP TS 38.211 V16.6.0.

For PUSCH scheduled by DCI format 0_1, if puschRepTypeIndicatorDCI-0-1 is set to 'pusch-RepTypeB', the UE applies PUSCH repetition Type B procedure when determining the time domain resource allocation. For PUSCH scheduled by DCI format 0_2, if pusch-RepTypeIndicatorDCI-0-2 is set to 'pusch-RepTypeB', the UE applies PUSCH repetition Type B procedure when determining the time domain resource allocation. Otherwise, the UE applies PUSCH repetition Type A procedure when determining the time domain resource allocation for PUSCH scheduled by PDCCH.

For PUSCH repetition Type A, the starting symbol S relative to the start of the slot, and the number of consecutive symbols L counting from the symbol S allocated for the PUSCH are determined from the start and length indicator SLIV of the indexed row:

```
if (L − 1) ≤ 7 then
    SLIV = 14 · (L − 1) + S
else
    SLIV = 14 · (14 − L + 1) + (14 − 1 − S)
where 0 < L ≤ 14 − S.
```

For PUSCH repetition Type B, the starting symbol S relative to the start of the slot, and the number of consecutive symbols L counting from the symbol S allocated for the PUSCH are provided by startSymbol and length of the indexed row of the resource allocation table, respectively.

For PUSCH repetition Type A, the PUSCH mapping type is set to Type A or Type B as defined in Clause 6.4.1.1.3 of 3GPP TS 38.211 V16.6.0 as given by the indexed row. For PUSCH repetition Type B, the PUSCH mapping type is set to Type B. The UE shall consider the S and L combinations defined in Table 1 as valid PUSCH allocations.

TABLE 1

Valid S and L combinations (based on table 6.1.2.1-1 of 3GPP TS 38.211 V16.6.0)

| PUSCH mapping type | Normal cyclic prefix | | | Extended cyclic prefix | | |
|---|---|---|---|---|---|---|
| | S | L | S + L | S | L | S + L |
| Type A (repetition Type A only) | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} for repetition Type A, {1, . . . , 27} for repetition Type B | {0, . . . , 11} | {1, . . . , 12} | {1, . . . , 12} for repetition Type A, {1, . . . , 23} for repetition Type B |

For PUSCH repetition Type A, when transmitting PUSCH scheduled by DCI format 0_1 or 0_2 in PDCCH with cyclic redundancy check ("CRC") scrambled with cell Radio Network Temporary Identifier ("C-RNTI"), Modulation and Coding Scheme C-RNTI ("MCS-C-RNTI"), or Configured Scheduling Radio Network Temporary Identifier ("CS-RNTI") with New Data Indicator ("NDI")=1, the number of repetitions K is determined as
- if numberOfRepetitions is present in the resource allocation table, the number of repetitions K is equal to numberOfRepetitions;
- else, if the UE is configured with pusch-AggregationFactor, the number of repetitions K is equal to pusch-AggregationFactor;
- otherwise, K=1.

For PUSCH repetition Type A, in case K>1, the same symbol allocation is applied across the K consecutive slots and the PUSCH is limited to a single transmission layer. The UE shall repeat the transport block ("TB") across the K consecutive slots applying the same symbol allocation in each slot. The redundancy version to be applied on the nth transmission occasion of the TB, where n=0, 1, . . . K−1, is determined according to Table 2.

TABLE 2

Redundancy version for PUSCH transmission (based on the table 6.1.2.1-1 of 3GPP TS 38.211 V16.6.0)

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

When transmitting MsgA PUSCH on a non-initial UL Bandwidth Part ("BWP"), if the UE is configured with startSymbolAndLengthMsgA-PO, the UE shall determine the S and L from startSymbolAndLengthMsgA-PO. When transmitting MsgA PUSCH, if the UE is not configured with startSymbolAndLengthMsgA-PO, and if the TDRA list PUSCH-TimeDomainResourceAllocationList is provided in PUSCH-ConfigCommon, the UE shall use msgA-PUSCH-TimeDomainAllocation to indicate which values are used in the list. If PUSCH-TimeDomainResourceAllocationList is not provided in PUSCH-ConfigCommon, the UE shall use parameters S and L from table 6.1.2.1.1-2 or table 6.1.2.1.1-3 where msgA-PUSCH-TimeDomainAllocation indicates which values are used in the list. The time offset for PUSCH transmission is described in 3GPP TS 38.213 V16.6.0.

For PUSCH repetition Type A, a PUSCH transmission in a slot of a multi-slot PUSCH transmission is omitted according to the conditions in Clause 9, Clause 11.1 and Clause 11.2A of 3GPP TS 38.213 V16.6.0.

In various examples, the following procedure for resource allocation for UL transmission with configured grant is followed:

When PUSCH resource allocation is semi-statically configured by higher layer parameter configuredGrantConfig in BWP-UplinkDedicated information element, and the PUSCH transmission corresponding to a configured grant, the following higher layer parameters are applied in the transmission:

For Type 1 PUSCH transmissions with a configured grant, the following parameters are given in configuredGrantConfig unless mentioned otherwise: For the determination of the PUSCH repetition type, if the higher layer parameter pusch-RepTypeIndicator in rrc-ConfiguredUplinkGrant is configured and set to 'pusch-RepTypeB', PUSCH repetition type B is applied; otherwise, PUSCH repetition type A is applied.

For PUSCH repetition type A, the selection of the time domain resource allocation table follows the rules for DCI format 0_0 on UE specific search space, as defined in Clause 6.1.2.1.1. For PUSCH repetition type B, the selection of the time domain resource allocation table is as follows: If pusch-RepTypeIndicatorDCI-0-1 in pusch-Config is configured and set to 'pusch-RepTypeB', pusch-TimeDomainResourceAllocationListDCI-0-1 in pusch-Config is used; Otherwise, pusch-TimeDomainResourceAllocationListDCI-0-2 in pusch-Config is used.

It is not expected that pusch-RepTypeIndicator in rrc-ConfiguredUplinkGrant is configured with 'pusch-RepTypeB' when none of pusch-RepTypeIndicatorDCI-0-1 and pusch-RepTypeIndicatorDCI-0-2 in pusch-Config is set to 'pusch-RepTypeB'. The higher layer parameter timeDomainAllocation value m provides a row index m+1 pointing to the determined time domain resource allocation table, where the start symbol and length are determined following the procedure defined in Clause 6.1.2.1 of 3GPP TS 38.214 V16.6.0.

Frequency domain resource allocation is determined by the NLSB bits in the higher layer parameter frequencyDomainAllocation, forming a bit sequence $f_{17}, \ldots, f_1, f_0$, where $f_0$ is the LSB, according to the procedure in Clause 6.1.2.2 of 3GPP TS 38.214 V16.6.0 and N is determined as the size of frequency domain resource assignment field in DCI format 0_1 for a given resource allocation type indicated by resourceAllocation, except if useInterlacePUCCH-PUSCH in BWP-UplinkDedicated is configured, in which case uplink type 2 resource allocation is used wherein the UE interprets the LSB bits in the higher layer parameter frequencyDomainAllocation as for the frequency domain resource assignment field of DCI 0_1 according to the procedure in Clause 6.1.2.2.3 of 3GPP TS 38.214 V16.6.0. The $I_{MCS}$ is provided by higher layer parameter mcsAndTBS.

Number of DM-RS Code Division Multiplexing ("CDM") groups, DM-RS ports, Sounding Reference Signal ("SRS") resource indication and DM-RS sequence initialization are determined as in Clause 7.3.1.1.2 of 3GPP TS 38.212 V16.6.0, and the antenna port value, the bit value for DM-RS sequence initialization, precoding information and number of layers, SRS resource indicator are provided by antennaPort, dmrs-SeqInitialization, precodingAndNumber-Wayers, and srs-ResourceIndicator respectively. When frequency hopping is enabled, the frequency offset between two frequency hops can be configured by higher layer parameter frequencyHoppingOffset.

For Type 2 PUSCH transmissions with a configured grant: the resource allocation follows the higher layer configuration according to 3GPP TS 38.321, and UL grant received on the DCI. The PUSCH repetition type and the time domain resource allocation table are determined by the PUSCH repetition type and the time domain resource allocation table associated with the UL grant received on the DCI, respectively, as defined in Clause 6.1.2.1.

For PUSCH transmissions with a Type 1 or Type 2 configured grant, the number of (nominal) repetitions K to be applied to the transmitted transport block is provided by the indexed row in the time domain resource allocation table if numberOfRepetitions is present in the table; otherwise, K is provided by the higher layer configured parameters repK. The UE shall not transmit anything on the resources configured by configuredGrantConfig if the higher layers did not deliver a transport block to transmit on the resources allocated for uplink transmission without grant.

A set of allowed periodicities P are defined in 3GPP TS 38.331. The higher layer parameter cg-nrofSlots, provides the number of consecutive slots allocated within a configured grant period. The higher layer parameter cg-nrof-PUSCH-InSlot provides the number of consecutive PUSCH allocations within a slot, where the first PUSCH allocation follows the higher layer parameter timeDomainAllocation for Type 1 PUSCH transmission or the higher layer configuration according to 3GPP TS 38.321, and UL grant received on the DCI for Type 2 PUSCH transmissions, and the remaining PUSCH allocations have the same length and PUSCH mapping type, and are appended following the previous allocations without any gaps. The same combination of start symbol and length and PUSCH mapping type repeats over the consecutively allocated slots.

For operation with shared spectrum channel access where a UE is performing uplink transmission with configured grants in contiguous Orthogonal Frequency Division Multiplexing ("OFDM") symbols on all resource blocks ("RBs") of an RB set, for the first such UL transmission the UE determines a duration of a cyclic prefix extension $T_{ext}$ to be applied for transmission according to 3GPP TS 38.211 where the index for $\Delta_i$ is chosen randomly from a set of values configured by higher layers according to the following rule: If the first such UL transmission is within a channel occupancy initiated by the gNB (defined in Clause 4 of 3GPP TS 37.213), the set of values is determined by cg-StartingFullBW-InsideCOT; otherwise, the set of values is determined by cg-StartingFullBW-OutsideCOT.

For operation with shared spectrum channel access where a UE is performing uplink transmission with configured grants in contiguous OFDM symbols on fewer than all resource blocks of an RB set, for the first such UL transmission the UE determines a duration of a cyclic prefix extension $T_{ext}$ to be applied for transmission according to 3GPP TS 38.211 according to the following rule: If the first such UL transmission is within a channel occupancy initiated by the gNB (defined in Clause 4 of 3GPP TS 37.213), the index for $\Delta_i$ is equal to cg-StartingPartialBW-Inside-COT; otherwise, the index for $\Delta_i$ is equal to cg-StartingPartialBW-OutsideCOT.

Regarding Transport Block ("TB") repetition for uplink transmissions of PUSCH repetition Type A with a configured grant, the procedures described below apply to PUSCH transmissions of PUSCH repetition Type A with a Type 1 or Type 2 configured grant.

The higher layer parameter repK-RV defines the redundancy version pattern to be applied to the repetitions. If cg-RetransmissionTimer is provided, the redundancy version for uplink transmission with a configured grant is determined by the UE. If the parameter repK-RV is not provided in the configuredGrantConfig and cg-RetransmissionTimer is not provided, the redundancy version for uplink transmissions with a configured grant shall be set to 0. If the parameter repK-RV is provided in the configuredGrantConfig and cg-RetransmissionTimer is not provided, for the nth transmission occasion among K repetitions, n=1, 2, ..., K, it is associated with $(\mod(n-1,4)+1)^{th}$ value in the configured RV sequence.

If a configured grant configuration is configured with startingFromRV0 set to 'off', the initial transmission of a transport block may only start at the first transmission occasion of the K repetitions. Otherwise, the initial transmission of a transport block may start at: A) the first transmission occasion of the K repetitions if the configured RV sequence is {0,2,3,1}, B) any of the transmission occasions of the K repetitions that are associated with RV=0 if the configured RV sequence is {0,3,0,3}, C) any of the transmission occasions of the K repetitions if the configured RV sequence is {0,0,0,0}, except the last transmission occasion when K≥8.

For any RV sequence, the repetitions shall be terminated after transmitting K repetitions, or at the last transmission occasion among the K repetitions within the period P, or from the starting symbol of the repetition that overlaps with a PUSCH with the same HARQ process scheduled by DCI format 0_0, 0_1 or 0_2, whichever is reached first. In addition, the UE shall terminate the repetition of a transport block in a PUSCH transmission if the UE receives a DCI format 0_1 with downlink feedback information ("DFI") flag provided and set to '1', and if in this DCI the UE detects ACK for the HARQ process corresponding to that transport block.

The UE is not expected to be configured with the time duration for the transmission of K repetitions larger than the time duration derived by the periodicity P (e.g., the time duration between the start of the first transmission occasion of the K repetitions and the end of the K repetitions for any instance of a configured grant period). If the UE determines that, for a transmission occasion, the number of symbols available for the PUSCH transmission in a slot is smaller than transmission duration L, the UE does not transmit the PUSCH in the transmission occasion.

For both Type 1 and Type 2 PUSCH transmissions with a configured grant, when K>1, the UE shall repeat the TB across the K consecutive slots applying the same symbol allocation in each slot, except if the UE is provided with higher layer parameters cg-nrofSlots and cg-nrofPUSCH-InSlot, in which case the UE repeats the TB in the repK earliest consecutive transmission occasion candidates within the same configuration. A Type 1 or Type 2 PUSCH transmission with a configured grant in a slot is omitted according to the conditions in Clause 9, Clause 11.1 and Clause 11.2A of 3GPP TS 38.213.

FIG. 1 depicts a wireless communication system 100 for enhanced UL repetition indication and repetition procedure for coverage, according to examples of the disclosure. In one or more examples, the wireless communication system 100 includes at least one remote unit 105, a Radio Access Network 120, and a mobile core network 140. The RAN 120 and the mobile core network form a mobile communication network. The RAN 120 contains at least one base unit 121 and may be composed of a 3GPP access network (e.g., containing at least one cellular base unit), a non-3GPP access network (e.g., containing at least one access point) and/or a wireline access network (e.g., serving a residential gateway). The remote unit communicates with the 3GPP access network 120 using communication links 123. Even though a specific number of remote units 105, RANs 120, base units 121, communication links 123, and mobile core networks 140 are depicted in FIG. 1, one of skill in the art will recognize that any number of remote units 105, RANs 120, base units 121, communication links 123, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one or more examples, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some examples, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the communication links 123. Here, the RAN 120 is an intermediate network that provides the remote units 105 with access to the mobile core network 140.

In some examples, the remote units 105 communicate with an application server 151 (or other communication peer) via a network connection with the mobile core network 140. For example, an application 107 in a remote unit 105 (e.g., web browser, media client, telephone/VoIP application) may trigger the remote unit 105 to establish a Packet Data Unit to ("PDU") session (or other data connection) with the mobile core network 140 using the RAN 120 (e.g., a 3GPP access network and/or non-3GPP access network). The mobile core network 140 then relays traffic between the remote unit 105 and the data network 150 (e.g., application server 151) using the PDU session. The PDU session represents a logical connection between the remote unit 105 and the User Plane Function ("UPF") 141. In order to establish the PDU session, the remote unit 105 must be registered with the mobile core network. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data networks and/or other communication peers.

The base units 121 may be distributed over a geographic region. In certain examples, a base unit 121 may also be referred to as an access terminal, a base, a base station, a Node-B, an evolved Node B ("eNB"), a 5G/NR Node B ("gNB"), a Home Node-B, a relay node, a device, an access point, or by any other terminology used in the art. The base units 121 are generally part of a radio access network ("RAN"), such as the 3GPP access network 120, that may include one or more controllers communicably coupled to one or more corresponding base units 121. These and other elements of radio access network are not illustrated but are well known generally by those having ordinary skill in the art. The base units 121 connect to the mobile core network 140 via the 3GPP access network 120.

The base units 121 may serve a number of remote units 105 within a serving area, for example, a cell or a cell sector, via a communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 123. The communication links 123 may be any suitable carrier in licensed or unlicensed radio spectrum. The communication links 123 facilitate communication between one or more of the remote units 105 and/or one or more of the base units 121.

In one or more examples, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NF"s). As depicted, the mobile core network 140 includes one or more user plane functions ("UPF"s). Here, the mobile core network 140 includes at least a UPF 141 that serves the RAN 120. Note that in certain examples, the mobile core network may contain one or more intermediate UPFs (not shown). In such examples, the UPF 141 may be an anchor UPF receiving UP traffic of both intermediate UPFs.

The mobile core network 140 also includes multiple control plane functions including, but not limited to, an Access and Mobility Management Function ("AMF") 143, a Session Management Function ("SMF") 145, a Policy Control Function ("PCF") 147, and a Unified Data Management/User Data Repository function ("UDM/UDR") 149. In certain examples, the mobile core network 140 may also include an Authentication Server Function ("AUSF"), a Network Repository Function ("NRF") (used by the various NFs to discover and communicate with each other over Application Programming Interfaces ("APIs"), or other NFs defined for the 5GC.

In various examples, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a single Network Slice Selection Assistance Information ("S-NSSAI"), while a set of network slices for which the remote unit 105 is authorized to use is identified by Network Slice Selection Assistance Information ("NSSAI"). In certain examples, the various network slices may include separate instances of network functions, such as the SMF 145 and UPF 141. In some examples, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an Mobility Management Entity ("MME"), Serving Gateway ("S-GW"), Packet Data Network Gateway ("P-GW"), Home Subscriber Server ("HSS"), and the like. In certain examples, the mobile core network 140 may include an Authentication, Authorization, Accounting ("AAA") server.

While FIG. 1 depicts components of a 5G RAN and a 5G core network, the described examples for enhanced UL repetition indication and repetition procedure for coverage apply to other types of communication networks and Radio Access Technologies ("RATs"), including IEEE 802.11 variants, Global System for Mobile Communications ("GSM"), General Packet Radio Service ("GPRS"), Universal Mobile Telecommunications System ("UMTS"), Long Term Evolution ("LTE") variants, Code Division Multiple Access ("CDMA") 2000, Bluetooth®, ZigBee®, Sigfox®, and the like. For example, in an LTE variant involving an EPC, the AMF 143 may be mapped to an MME, the SMF 145 may be mapped to a control plane portion of a Packet Data Network gateway ("PGW") and/or to an MME, the UPF 141 may be mapped to a serving gateway ("SGW") and a user plane portion of the PGW, the UDM/UDR 149 may be mapped to an HSS, etc.

In the following descriptions, the term "RAN node" is used for the base station but it is replaceable by any other radio access node, e.g., gNB, BS, eNB, gNB, AP, etc. Further the operations are described mainly in the context of 5G NR. However, the proposed solutions/methods are also equally applicable to other mobile communication systems supporting enhanced UL repetition indication and repetition procedure for coverage.

The wireless communication system 100 may apply the followings signaling for configuring and/or indicated enhanced PUSCH repetition type A. In some examples, a remote unit 105 will implicitly determine whether enhanced repetition type is applied or not based on the number of repetitions indicated to the remote unit 105.

A new parameter is described herein to determine a repetition span that is a duration to define the maximum number of transmissions occasions (slots) within which the actual number of repetitions should be contained. More specific enhancements for a time-domain resource allocation ("TDRA") table for facilitating different types of PUSCH repetition without excessive signaling overhead is described below with reference to FIG. 3.

FIG. 2 depicts a NR protocol stack 200, according to examples of the disclosure. While FIG. 2 shows a UE 205, a RAN node 210 and the 5G core network 207, these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, the Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a physical layer 211, a MAC sublayer 213, a RLC sublayer 215, and a PDCP sublayer 217. The Control Plane protocol stack 203 also includes a Radio Resource Control ("RRC") layer 221 and a Non-Access Stratum ("NAS") layer 223.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC). The RRC layer 221 provides for the addition, modification, and release of Carrier Aggregation and/or Dual Connectivity. The RRC layer 221 also manages the establishment, configuration, maintenance, and release of Signaling Radio Bearers ("SRBs") and Data Radio Bearers ("DRBs").

Please note that in the following descriptions the terminology for some parameters used in this disclosure such as "TypeA_repS," TypeA_repK, etc. are just examples. Other terminologies with similar meaning could be actually be specified in 3GPP. The terminology "configured/indicated/provided" in the disclosure may be configured/indicated/provided by higher-layer layer signaling (e.g., RRC/MAC-CE higher layer parameters) and/or configured/indicated/provided in DCI associated with the transmission.

Configuration/Indication of Different Categories of PUSCH Repetition Type A

According to embodiments of the first solution, if UE may be configured (or indicated and/or provided) with an enhanced PUSCH repetition type-A (either explicitly by indication of new parameter or implicitly based on other parameters) and UE is either indicated with "numberofRepetitions" in TDRA and/or configured with repetition factor "repK" and/or configured with "pusch-AggregationFactor", then the indicated/configured number of repetitions is applied as actual number of repetitions (only UL slots) or number of actual repetitions or number of PUSCH transmission occasions with actual PUSCH transmission (with the counting not including the PUSCH transmission occasions that are omitted, e.g., according to the conditions in Clause 9, Clause 11.1 and Clause 11.2A of 3GPP TS 38.213) if the indicated/configured number of repetitions is below a certain threshold value, otherwise the number of repetitions indicates consecutive number of slots (including UL/DL/flexible symbols) or number of nominal PUSCH repetitions or number of PUSCH transmission occasions across consecutive slots (with the counting including the PUSCH transmission occasions that are omitted).

For example, if the indicated number of repetitions is 16 or less (e.g., 8,4,2,1) and if the UE is configured with enhanced PUSCH repetition type-A, then the number is used to determine number of UL slots (available with required number of UL symbols) for PUSCH repetitions. However, if number of repetitions is greater than 16, for example 20, then the number of repetitions is used to determine the consecutive number of slots (including UL/DL/flexible symbols) within which the UE performs PUSCH repetitions.

FIG. 3 depicts one example of a TDRA table 300. In one implementation, enhanced PUSCH repetition type-A is indicated dynamically by TDRA table. In another implementation, the UE is configured/indicated/provided with the threshold value (e.g., by higher layer signaling such as in an RRC parameter).

In some examples, a PUSCH transmission occasion comprises a PUSCH transmission in an UL slot. A PUSCH transmission occasion may be a nominal PUSCH repetition. In some examples, the UE is indicated (e.g., by higher layers such as in an RRC parameter or a field in DCI) a repetition format 'pusch-RepTypeA-RepFormat' indicating whether the repetition value (e.g., indicated with "numberofRepetitions" in TDRA and/or configured with repetition factor "repK" and/or configured with "pusch-AggregationFactor") is counting a number of actual repetitions (or number of PUSCH transmission occasions with actual PUSCH transmission (with the counting not including the PUSCH transmission occasions that are omitted)), or counting a number of nominal PUSCH repetitions (or number of PUSCH transmission occasions across consecutive slots (with the counting including the PUSCH transmission occasions that are omitted)). If the UE is indicated with the number of actual repetitions, then the UE determines the PUSCH repetition type as enhanced PUSCH repetition type-A, PUSCH repetition type-A otherwise. In one or more examples, if the 'pusch-RepTypeA-RepType' is not indicated, the UE determines the PUSCH repetition type as PUSCH repetition type-A with the repetition value as the number of nominal PUSCH repetitions.

In an alternate example, the UE is not explicitly configured/indicated with an enhanced PUSCH repetition type-A, but explicitly indicated/configured with a new parameter for indicating actual number of repetitions, then in this case enhanced PUSCH repetition type-A is assumed (or the UE determines the PUSCH repetition type as enhanced PUSCH repetition type-A) and the number of repetitions is used to determine the available UL slots for transmissions. In an alternate example, the UE is not explicitly configured/indicated with an enhanced PUSCH repetition type-A, but explicitly indicated/configured with a parameter for indicating a repetition span duration "TypeA_repS" beyond which repetitions are not transmitted, in that case enhanced PUSCH repetition type-A is assumed. Additionally, another repetition number could be configured/indicated (number of actual repetitions), and the UE will transmit the indicated repetitions that can be contained within the indicated/configured repetition span. In other words, the indication of "numberofRepetitions" may or may not be configured and counting based on physical slots is used.

In some examples, the UE is not expected to be simultaneously configured with PUSCH repetitions type-B and enhanced PUSCH repetition type-A. In an alternate example, if both PUSCH repetition type-B and PUSCH repetition type-A are configured to a UE, then only PUSCH repetition type-B is applied for repetitions. In some examples, when the UE is configured/indicated with enhanced PUSCH repetition type A, then a new TDRA table (e.g., similar to the PUSCH TimeDomainResourceAllocation-r16 structure) is configured and a new field (e.g., similar to numberOfRepetitions-r17(is added to be used to indicate actual number of repetitions. In one implementation, the TDRA table includes two values for numberofRepetitions (for each entry in the TDRA table), where one value is number of repetitions counted as total consecutive slots (or number of nominal repetitions) and other value is number of repetitions counted as available UL slots (or number of actual repetitions).

For example, if the UE has slot format 'DDUUUUDD-UUUUDDUUUUDDUUUU' (with 'D' representing a downlink slot and IF representing an uplink slot) and if the actual number of repetitions indicated to a UE is 16, and the number of repetitions (consecutive slots) is indicated to be 32, then the UE stops transmission after $24^{th}$ consecutive slots (as it takes 24 slots for a UE to transmit 16 repetitions as 8 slots are DL and not available for UL transmissions) and does not continue till the end of 32n d consecutive slots.

On the other hand, for a slot format 'DDDUUUDDD-UUUDDDUUUDDDUUU' (with 'D' representing a downlink slot and 'U' representing an uplink slot) as the actual number of repetitions transmitted in 32 consecutive slots is 12 and less than 16, then UE will stop the repetitions at the end of $32^{nd}$ slot (with 12 actual repetitions).

In another implementation of the first solution, the TDRA table includes for each entry in the TDRA table a value for numberofRepetitions and a value for the repetition format.
Repetition Span for Transmitting a Number Of Repetitions for PUSCH Repetition Type A According to embodiments of the second solution, the UE may be configured/indicated with a repetition span duration "TypeA_repS" and/or repetition factor/value "TypeA_repK" for a PUSCH repetition in multiple TTIs (such as slot for slot-based repetition), wherein the repetition span is used to determine the maximum duration within which N number of repetitions can be actually transmitted such that N can be smaller than or equal to "TypeA_repK."

In some examples, each of the repetition span "TypeA_repS" and repetition factor "TypeA_repK" indicate a number of consecutive slots (slots including any of UL, DL or flexible symbols), where "TypeA_repS" is always greater than or equal to "TypeA_repK." In some examples, repetition span "TypeA_repS" indicates a number of consecutive slots (slots including any of UL, DL or flexible symbols) and repetition factor "TypeA_repK" indicates number of UL slots (or number of actual repetitions).

In some examples, the UE transmits PUSCH in the up to "TypeA_repK" earliest PUSCH transmission occasions with actual PUSCH transmission (with the counting not including the PUSCH transmission occasions that are omitted, e.g., according to the conditions in Clause 9, Clause 11.1 and Clause 11.2A of 3GPP TS 38.213) within the "TypeA_repS" consecutive transmission occasion candidates or consecutive slots.

For example, if the UE has slot format 'DDUUUUDD-UUUUDDUUUUDDUUUU,' (with 'D' representing a downlink slot and 'U' representing an uplink slot) and if the actual number of repetitions, "TypeA_repK", indicated to the UE is 16, and the repetition span duration, "TypeA_repS", of the number consecutive slots is indicated to be 32, then the UE stops transmission after $24^{th}$ consecutive slots (as it takes 24 slots for a UE to transmit 16 repetitions as 8 slots are DL and not available for UL transmissions) and doesn't continue till the end of $32^{nd}$ consecutive slots.

On the other hand, for a slot format 'DDDUUUDDD-UUUDDDUUUDDDUUU' (with 'D' representing a downlink slot and IF representing an uplink slot) as the actual number of repetitions transmitted in 32 consecutive slots is 12 and less than 16, then the UE will stop the repetitions at the end of 32n d slot (with 12 actual repetitions).

In one or more examples, the UE is scheduled by DCI format 0_1 or 0_2 in PDCCH, and the repetition factor "TypeA_repK" is semi-statically configured by higher layers and the repetition span "TypeA_repS" is dynamically indicated by the scheduling DCI. In one implementation, "TypeA_repK" is indicated by higher layers (e.g., the RRC parameter "pusch-AggregationFactor") and the repetition span "TypeA_repS" is indicated as a part of the time-domain resource allocation table. In one implementation, "TypeA_repS" is indicated by a dedicated column in the TDRA table. In one implementation, the repetition span "TypeA_repS" is indicated by the "numberofRepetitions" in the TDRA table.

In certain examples, a UE is configured with "pusch-AggregationFactor" as well repetition factor "TypeA_repK" and if repetition span "TypeA_repS" is dynamically indicated by the scheduling DCI (either with TDRA table by "numberofRepetitions" or a separate column or separately by other DCI field), the repetition factor "TypeA_repK" is followed for repetition span "TypeA_repS" and "pusch-AggregationFactor" is not applied, otherwise the "pusch-AggregationFactor" is applied. In an alternate example, if the UE is configured with repetition factor "repK" and also indicated with repetition span "TypeA_repS" dynamically by the scheduling DCI (either with TDRA table by "numberofRepetitions" or a separate column or separately by other DCI field), then the repetition factor "repK" is followed for repetition span "TypeA_repS."

In various examples, both the repetition span and repetition factor are indicated dynamically by separate columns in the TDRA table.

In some examples, if no repetition span is configured/indicated to the UE and the UE is only indicated with "numberofRepetitions" in the TDRA table, then the repetition span is assumed to be equal to "numberofRepetitions."

In certain examples, if no repetition span is configured/indicated to the UE and the UE is only indicated with "numberofRepetitions" in the TDRA table, the UE uses PUSCH repetition type-A across "numberofRepetitions" consecutive slots (with "numberofRepetitions" indicating the number of nominal PUSCH repetitions or number of PUSCH transmission occasions across consecutive slots (with the counting including the PUSCH transmission occasions that are omitted).

In one or more examples, the UE is configured/indicated with actual number of repetitions and repetition span "TypeA_repS," where all the available UL slots are used for repetition unless the actual number of repetitions is exhausted, or the repetition span is over (basically whichever ends first).

In certain examples, the UE is configured with PUSCH configured grant (CG) type 1 or type 2, where the UL CG resource allocation is configured with repetition factor "TypeA_repK" and additionally configured with repetition span "TypeA_repS". In another example, the UE is configured with PUSCH configured grant type 2, where the UL CG resource allocation is configured with repetition factor "TypeA_repK" and additional indicated with repetition span "TypeA_repS" in the TDRA table.

In certain examples, the UE is configured with PUSCH configured grant (CG) type 1 or type 2, where the UL CG resource allocation is configured with repetition factor "TypeA_repK" and configured with periodicity or CG and the repetition span is applied equal to the periodicity of the CG i.e., the number of repetitions configured for CG should be contained within the periodicity of the CG.

In some of the examples, the UE is configured to adapt the Modulation and Coding Scheme ("MCS") value to a lower value if the number of omitted slots for PUSCH transmission reaches a certain value. In one implementation, upon reaching a predefined number of omitted slots, the UE may autonomously switch to the next lower MCS value if the number of continuous symbols L is large enough for the UE to use the lower MCS for the TB in the next UL occasion. In another implementation, the UE is dynamically configured via DCI with the required number of symbols/resources to apply lower MCS value in the next UL occasion if the number of omitted slots reaches a certain value. PUSCH detection can be combined with the previous repetition in the soft-bit level. In one implementation, the UE is configured with a two-slot offset for TDRA, where the first slot offset is used to determining the slot for starting the first transmission and the second slot offset is the offset with respect to the first slot offset and is used to determine the slot where the particular instance of repetition can be transmitted with different MCS value with different duration in comparison to other repetitions.

Dynamic Indication for PUCCH Repetitions

According to embodiments of the third solution, the number of repetitions for PUCCH may be dynamically indicated by enhancing the PUCCH resource indicator (PRI) table, where each of the PUCCH resources is also associated with the number of repetitions.

FIG. 4 depicts a Table 400 for dynamic repetition indication with PRI, according to the third solution. The PRI codepoint in the DCI indicates to one of the indices. In one implementation of the third solution, when the UE is configured with multiple PUCCH resource sets, then a separate table for PRI including an indication of a number of repetitions for each of the PUCCH resource sets is included, where the number of repetitions can be different for each of the PUCCH resource set.

Therefore, for PUCCH resource sets, 4 PRI tables can be indicated, where maximum value for number of repetitions is R1, R2, R3 and R4 for PUCCH resource set 1, set 2, set 3 and set 4, respectively. Alternatively, also depending upon which PUCCH format is associated with PUCCH resource set and/or PUCCH resource within the set, different maximum value of number of repetitions can be configured. In some examples, for a combination of payload size and PUCCH format, different values of maximum number of repetitions are indicated.

Figure 5:
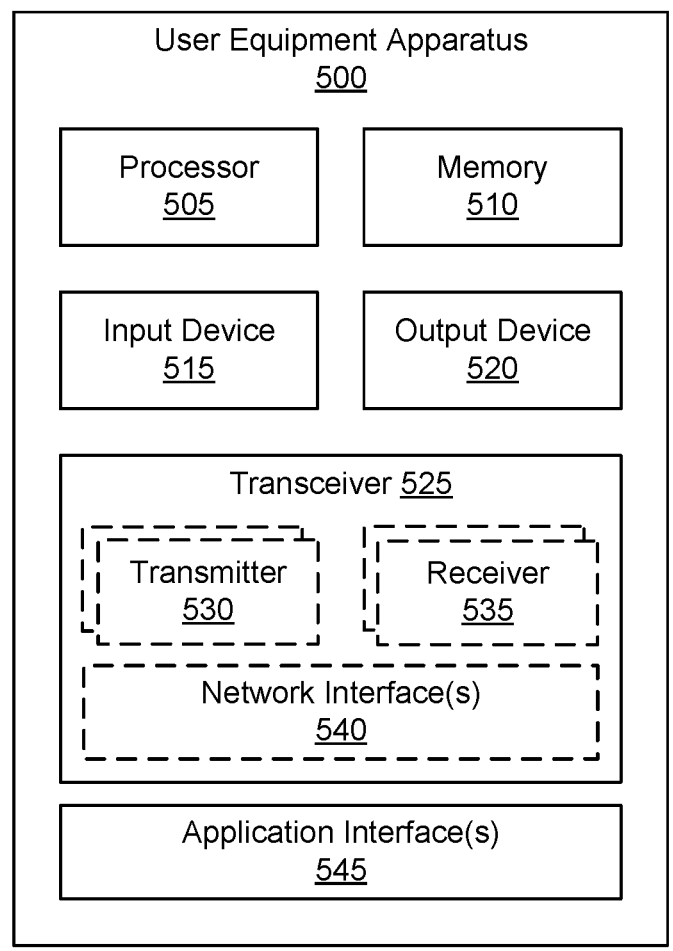
FIG. 5 is a block diagram illustrating a user equipment apparatus that may be used for enhanced UL repetition indication and repetition procedure for coverage, in accordance with one or more examples of the present disclosure.

FIG. 5 depicts a user equipment apparatus 500 that may be used for directional transmission/reception of groupcast and unicast communication, according to examples of the disclosure. In various examples, the user equipment apparatus 500 is used to implement one or more of the solutions/enhancements described above. The user equipment apparatus 500 may be one example of a UE, such as the remote unit 105, as described above. Furthermore, the user equipment apparatus 500 may include a processor 505, a memory 510, an input device 515, an output device 520, and a transceiver 525. In some examples, the input device 515 and the output device 520 are combined into a single device, such as a touchscreen. In certain examples, the user equipment apparatus 500 may not include any input device 515 and/or output device 520. In various examples, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. Here, the transceiver 525 communicates with one or more base units 121. Additionally, the transceiver 525 may support at least one network interface 540 and/or application interface 545. The application interface(s) 545 may support one or more APIs. The network interface(s) 540 may support SGPP reference points, such as Uu and PC5. Other network interfaces 540 may be supported, as understood by one of ordinary skill in the art.

The processor 505, in one or more examples, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some examples, the processor 505 executes instructions stored in the memory 510 to perform the methods and routines described herein. The processor 505 is communicatively coupled to the memory 510, the input device 515, the output device 520, and the transceiver 525.

In various examples, the processor 505 controls the user equipment apparatus 500 to implement the above described UE behaviors. In certain embodiments, the processor 605 may include an application processor (also known as "main processor") which manages application-domain and operating system ("OS") functions and a baseband processor (also known as "baseband radio processor") which manages radio functions.

The memory 510, in one or more examples, is a computer readable storage medium. In some examples, the memory 510 includes volatile computer storage media. For example, the memory 510 may include a RAM, including dynamic RAM ("DRAM"), synchronous dynamic RAM ("SDRAM"), and/or static RAM ("SRAM"). In some examples, the memory 510 includes non-volatile computer storage media. For example, the memory 510 may include a hard disk drive, a flash memory, or any other suitable non-volatile computer storage device. In some examples, the memory 510 includes both volatile and non-volatile computer storage media.

In some examples, the memory 510 stores data related to enhanced UL repetition indication and repetition procedure for coverage. For example, the memory 510 may store configured downlink assignment, configured uplink assignment, UE configurations, resource configurations, and the like. In certain examples, the memory 510 also stores program code and related data, such as an operating system or other controller algorithms operating on the user equipment apparatus 500 and one or more software applications.

The input device 515, in one or more examples, may include any known computer input device including a touch panel, a button, a keyboard, a stylus, a microphone, or the like. In some examples, the input device 515 may be integrated with the output device 520, for example, as a touchscreen or similar touch-sensitive display. In some examples, the input device 515 includes a touchscreen such that text may be input using a virtual keyboard displayed on the touchscreen and/or by handwriting on the touchscreen. In some examples, the input device 515 includes two or more different devices, such as a keyboard and a touch panel.

The output device 520, in one or more examples, is designed to output visual, audible, and/or haptic signals. In some examples, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain examples, the output device 520 includes one or more speakers for producing sound. For example, the output device 520 may produce an audible alert or notification (e.g., a beep or chime). In some examples, the output device 520 includes one or more haptic devices for producing vibrations, motion, or other haptic feedback. In some examples, all or portions of the output device 520 may be integrated with the input device 515. For example, the input device 515 and output device 520 may form a touchscreen or similar touch-sensitive display. In other examples, the output device 520 may be located near the input device 515.

The transceiver 525 includes at least transmitter 530 and at least one receiver 535. The transceiver 525 may be used to provide UL communication signals to a base unit 121 and to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one or more examples, the transceiver 525 includes a first transmitter/receiver pair used to communicate with a mobile communication network over licensed radio spectrum and a second transmitter/receiver pair used to communicate with a mobile communication network over unlicensed radio spectrum.

In certain examples, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some examples, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various examples, one or more transmitters 530 and/or one or more receivers 535 may be implemented and/or integrated into a single hardware component, such as a multi-transceiver chip, a system-on-a-chip, an ASIC, or other type of hardware component. In certain examples, one or more transmitters 530 and/or one or more receivers 535 may be implemented and/or integrated into a multi-chip module. In some examples, other components such as the network interface 540 or other hardware components/circuits may be integrated with any number of transmitters 530 and/or receivers 535 into a single chip. In such example, the transmitters 530 and receivers 535 may be logically configured as a transceiver 525 that uses one more common control signals or as modular transmitters 530 and receivers 535 implemented in the same hardware chip or in a multi-chip module.

The User Equipment apparatus 500 may be used for dynamic indication for PUCCH repetitions as described above. In various examples, the User Equipment apparatus 500 may include a transceiver 525, and a processor 505 that receives from a network (e.g., RAN 120) a Radio Resource Control ("RRC") configuration for one or more physical uplink control channel ("PUCCH") resources sets and corresponding one or more PUCCH resource configurations (e.g., PUCCH Resource 402) for each of the configured PUCCH resource sets, where one or more of the corresponding PUCCH resource configurations indicate a number of slots (e.g., repetition factor 406) over which PUCCH can be repeated and receives from the network a downlink control information ("DCI"), where the DCI includes a PUCCH resource indicator ("PRI") to indicate one of a RRC configured PUCCH resources within a PUCCH resource set and a corresponding number of slots (e.g., repetition factor 406) for PUCCH repetition.

In certain examples, the processor 505 receives a PUCCH transmission that includes a number of repetitions less than or equal to the number of slots for PUCCH repetition for the indicated PUCCH resource in a PUCCH resource indicator table (see e.g., Table 400 described above with respect to FIG. 4). In various examples, for each of the one or more PUCCH resource sets, the repetition factor 406 indicates a number of slots for PUCCH repetition for each of the configured PUCCH resources is independently configured for the corresponding PUCCH resource indicator table (e.g., as depicted in Table 400).

In some examples, a range of the number of slots (e.g., 406) for PUCCH repetitions for each of the one or more PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set.

In certain examples, a range of the number of slots for PUCCH repetitions for each of the one or more PUCCH resource sets is independently configurable based on: a PUCCH format that is associated with the PUCCH resource set, a payload size; and combinations thereof.

Figure 6:
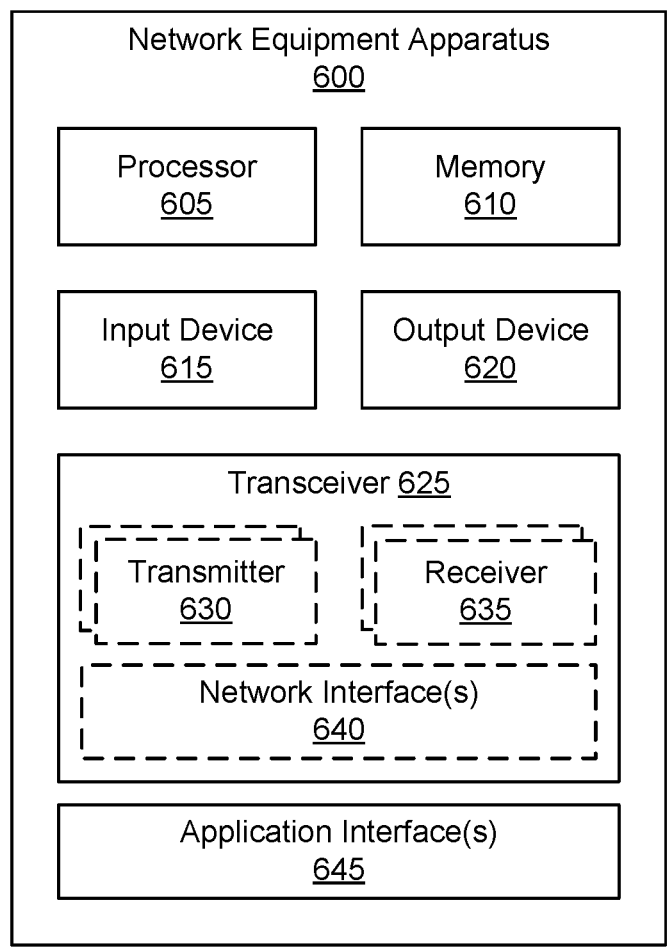
FIG. 6 is a block diagram illustrating a network equipment apparatus that may be used for enhanced UL repetition indication and repetition procedure for coverage, in accordance with one or more examples of the present disclosure.

FIG. 6 depicts one example of a network equipment apparatus 600 that may be used for directional transmission/reception of groupcast and unicast communication, according to examples of the disclosure. In some examples, the network apparatus 600 may be one example of a RAN node and its supporting hardware, such as the base unit 121, the RAN node 607 and/or gNB, described above. Furthermore, network equipment apparatus 600 may include a processor 605, a memory 610, an input device 615, an output device 620, and a transceiver 625. In certain examples, the network equipment apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3 interfaces. Other network interfaces 640 may be supported, as understood by one of ordinary skill in the art.

The processor 605, in one or more examples, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some examples, the processor 605 executes instructions stored in the memory 610 to perform the methods and routines described herein. The processor 605 is communicatively coupled to the memory 610, the input device 615, the output device 620, and the transceiver 625. In various examples, the processor 605 controls the network equipment apparatus 600 to implement the above described network entity behaviors (e.g., of the gNB, RAN node) for enhanced UL repetition indication and repetition procedure for coverage.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

The memory 610, in one or more examples, is a computer readable storage medium. In some examples, the memory 610 includes volatile computer storage media. For example, the memory 610 may include a RAM, including dynamic RAM ("DRAM"), synchronous dynamic RAM ("SDRAM"), and/or static RAM ("SRAM"). In some examples, the memory 610 includes non-volatile computer storage media. For example, the memory 610 may include a hard disk drive, a flash memory, or any other suitable non-volatile computer storage device. In some examples, the memory 610 includes both volatile and non-volatile computer storage media.

In some examples, the memory 610 stores data relating to enhanced UL repetition indication and repetition procedure for coverage. For example, the memory 610 may store UE configurations, resource configurations, resource grants, and the like. In certain examples, the memory 610 also stores program code and related data, such as an operating system ("OS") or other controller algorithms operating on the network equipment apparatus 600 and one or more software applications.

The input device 615, in one or more examples, may include any known computer input device including a touch panel, a button, a keyboard, a stylus, a microphone, or the like. In some examples, the input device 615 may be integrated with the output device 620, for example, as a touchscreen or similar touch-sensitive display. In some examples, the input device 615 includes a touchscreen such that text may be input using a virtual keyboard displayed on the touchscreen and/or by handwriting on the touchscreen. In some examples, the input device 615 includes two or more different devices, such as a keyboard and a touch panel.

The output device 620, in one or more examples, may include any known electronically controllable display or display device. The output device 620 may be designed to output visual, audible, and/or haptic signals. In some examples, the output device 620 includes an electronic display capable of outputting visual data to a user. Further, the output device 620 may be a component of a smart phone, a personal digital assistant, a television, a table computer, a notebook (laptop) computer, a personal computer, a vehicle dashboard, or the like.

In certain examples, the output device 620 includes one or more speakers for producing sound. For example, the output device 620 may produce an audible alert or notification (e.g., a beep or chime). In some examples, the output device 620 includes one or more haptic devices for producing vibrations, motion, or other haptic feedback. In some examples, all or portions of the output device 620 may be integrated with the input device 615. For example, the input device 615 and output device 620 may form a touchscreen or similar touch-sensitive display. In other examples, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 60). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain examples, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one or more examples, the transceiver 625 implements multiple logical transceivers using different communication protocols or protocol stacks, while using common physical hardware.

The network equipment apparatus 600 may be used to perform certain features for dynamic indication for PUCCH repetitions as described above. For example, the network apparatus 600 may include a transceiver 625 and a processor 605 that transmits to a User Equipment ("UE") a Radio Resource Control ("RRC") configuration for one or more physical uplink control channel ("PUCCH") resources sets and corresponding one or more PUCCH resource configurations for each of the configured PUCCH resource sets, wherein one or more of the corresponding PUCCH resource configurations indicate a number of slots over which PUCCH can be repeated. The processor 605 further transmits a downlink control information ("DCI"), wherein the DCI includes a PUCCH resource indicator ("PRI") to indicate one of a RRC configured PUCCH resources within a PUCCH resource set and a corresponding number of slots for PUCCH repetition.

In certain examples, the processor 605 transmits a PUCCH transmission that includes a number of repetitions less than or equal to the number of slots for PUCCH repetition for the indicated PUCCH resource in a PUCCH resource indicator table (see e.g., Table 400 described above with respect to FIG. 4). In some examples, for each of the one or more PUCCH resource sets, the number of slots for PUCCH repetition for each of the configured PUCCH resources is independently configured for the corresponding PUCCH resource indicator table.

In various examples, for each of the one or more PUCCH resource sets, the number of slots for PUCCH repetition for each of the configured PUCCH resources is independently configured for the corresponding PUCCH resource indicator table (e.g., as depicted in Table 400).

In some examples, a range of the number of slots for PUCCH repetitions for each of the one or more PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set.

In certain examples, a range of the number of slots for PUCCH repetitions for each of the one or more PUCCH resource sets is independently configurable based on: a PUCCH format that is associated with the PUCCH resource set, a payload size; and combinations thereof.

Figure 7:
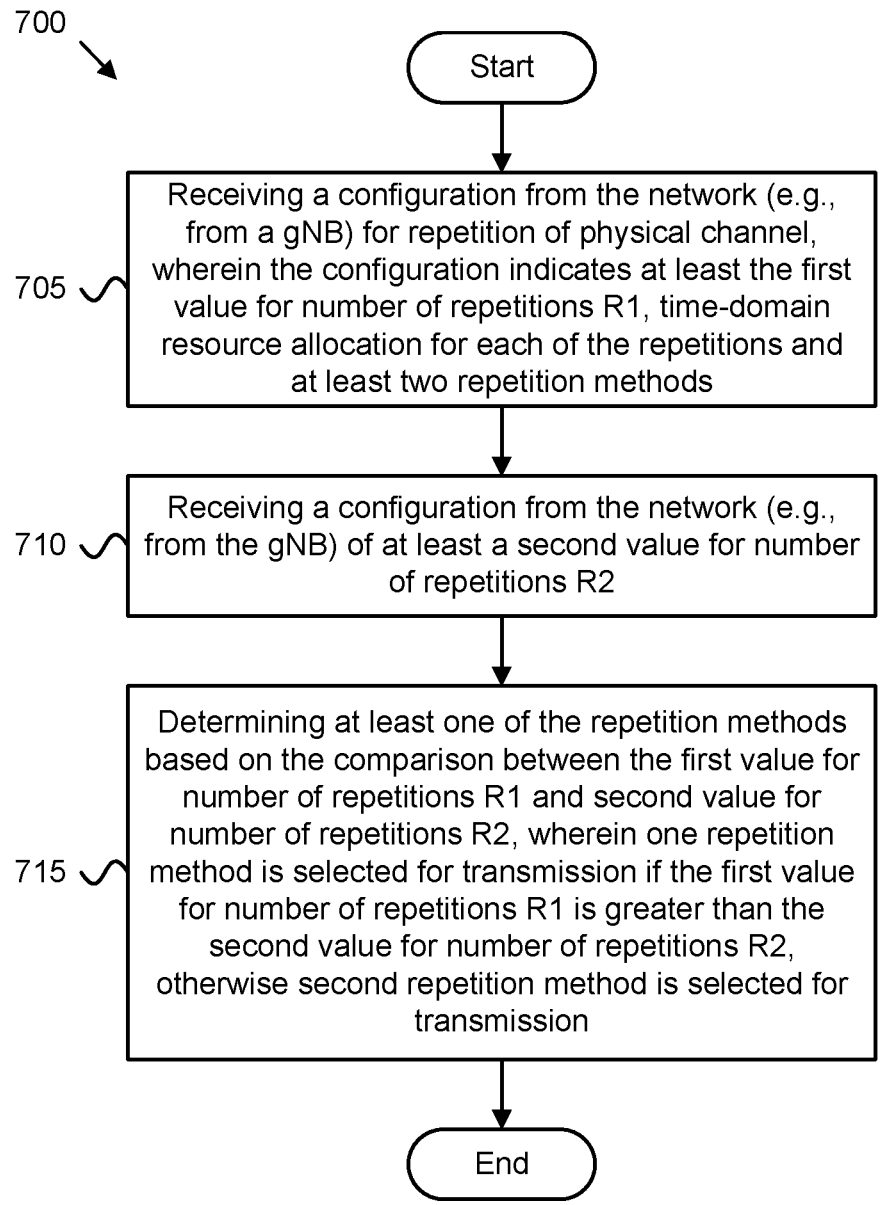
FIG. 7 is a flowchart diagram illustrating a method for enhanced UL repetition indication and repetition procedure for coverage, in accordance with one or more examples of the present disclosure.

FIG. 7 is a flowchart diagram of a method 700 for enhanced UL repetition indication and repetition procedure for coverage. The method 700 may be performed by a communication device as described herein, for example, the remote unit 105, the UE 205, and/or the user equipment apparatus 500. In some examples, the method 700 may be performed by a processor executing program code, for example, a microcontroller, a microprocessor, a CPU, a GPU, an auxiliary processing unit, a FPGA, or the like.

The method 700 includes receiving 705 a configuration from the network (e.g., from a gNB) for repetition of physical channel, where the configuration indicates at least the first value for number of repetitions R1, time-domain resource allocation for each of the repetitions and at least two repetition methods. The method 700 includes receiving 710 a configuration from the network (e.g., from the gNB) of at least a second value for number of repetitions R2. The method 700 includes determining 715 at least one of the repetition methods based on the comparison between the first value for number of repetitions R1 and second value for number of repetitions R2, where one repetition method is selected for transmission if the first value for number of repetitions R1 is greater than the second value for number of repetitions R2, otherwise a second repetition method is selected for transmission. The method 700 ends.

Figure 8:
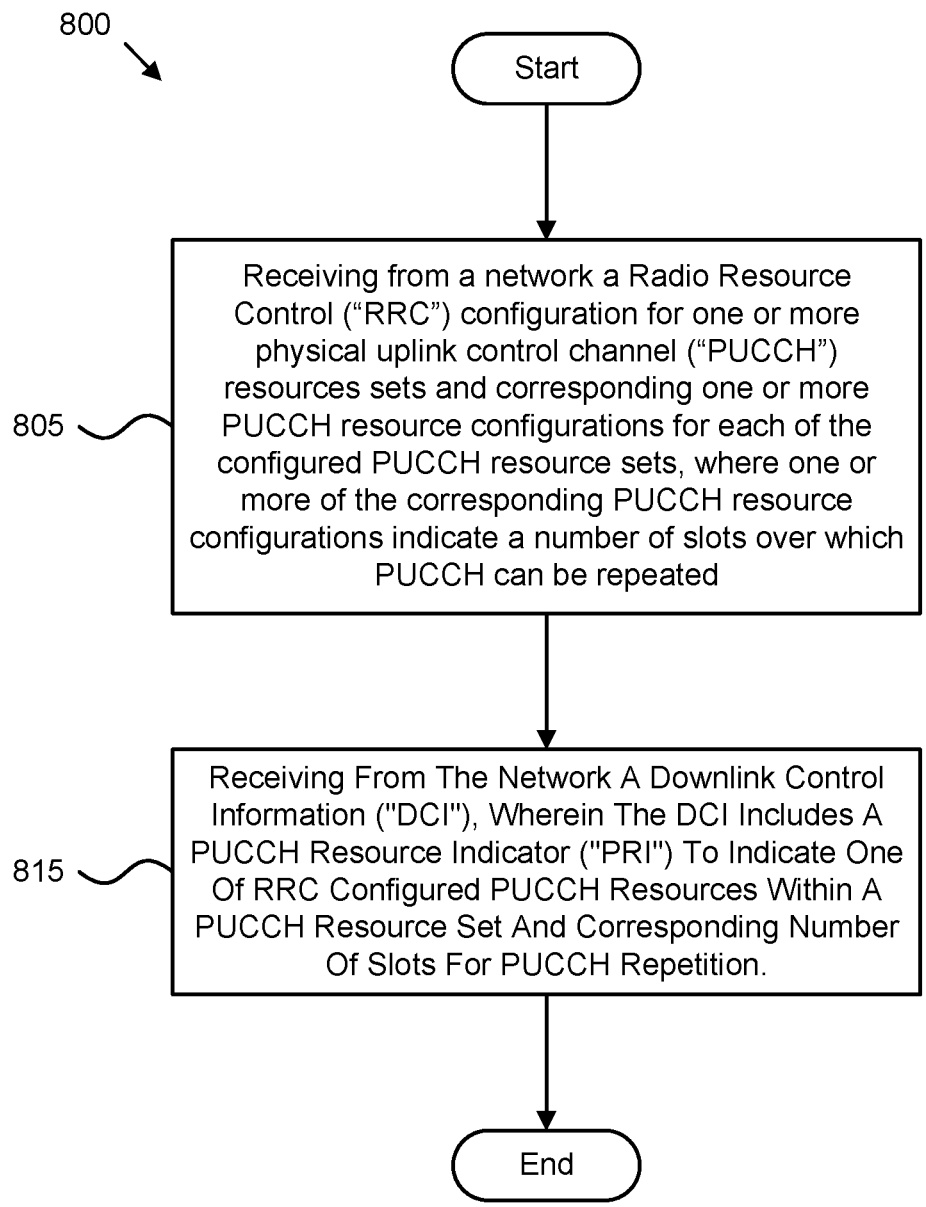
FIG. 8 is a flowchart diagram illustrating a UE method for enhanced UL repetition indication and repetition procedure for coverage, in accordance with one or more examples of the present disclosure.

FIG. 8 is a flowchart diagram of a UE method 800 for enhanced UL repetition indication and repetition procedure for coverage. The method 800 may be performed by a communication device as described herein, for example, the remote unit 105, the UE 205, and/or the user equipment apparatus 500. In some examples, the method 800 may be performed by a processor executing program code, for example, a microcontroller, a microprocessor, a CPU, a GPU, an auxiliary processing unit, a FPGA, or the like.

The method 800 includes receiving 805 receiving from a network a Radio Resource Control ("RRC") configuration for one or more physical uplink control channel ("PUCCH") resources sets and corresponding one or more PUCCH resource configurations for each of the configured PUCCH resource sets, where one or more of the corresponding PUCCH resource configurations indicate a number of slots over which PUCCH can be repeated. The method 800 further includes receiving from the network a downlink control information ("DCI"), where the DCI includes a PUCCH resource indicator ("PRI") to indicate one of a RRC configured PUCCH resources within a PUCCH resource set and a corresponding number of slots for PUCCH repetition.

In some examples, the method 800 includes performing a PUCCH transmission that includes a number of repetitions less than or equal to the number of slots for PUCCH repetition for the indicated PUCCH resource in a PUCCH resource indicator table. In certain examples, for each of the one or more PUCCH resource sets, the number of slots for PUCCH repetition for each of the configured PUCCH resources is independently configured for the corresponding PUCCH resource indicator table. In various examples, the number of slots for PUCCH repetitions for each of the one or more PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set. In certain examples, a range of the number of slots for PUCCH repetitions for each of the one or more PUCCH resource sets is independently configurable based on: a PUCCH format that is associated with the PUCCH resource set, a payload size; and combinations thereof.

Figure 9:
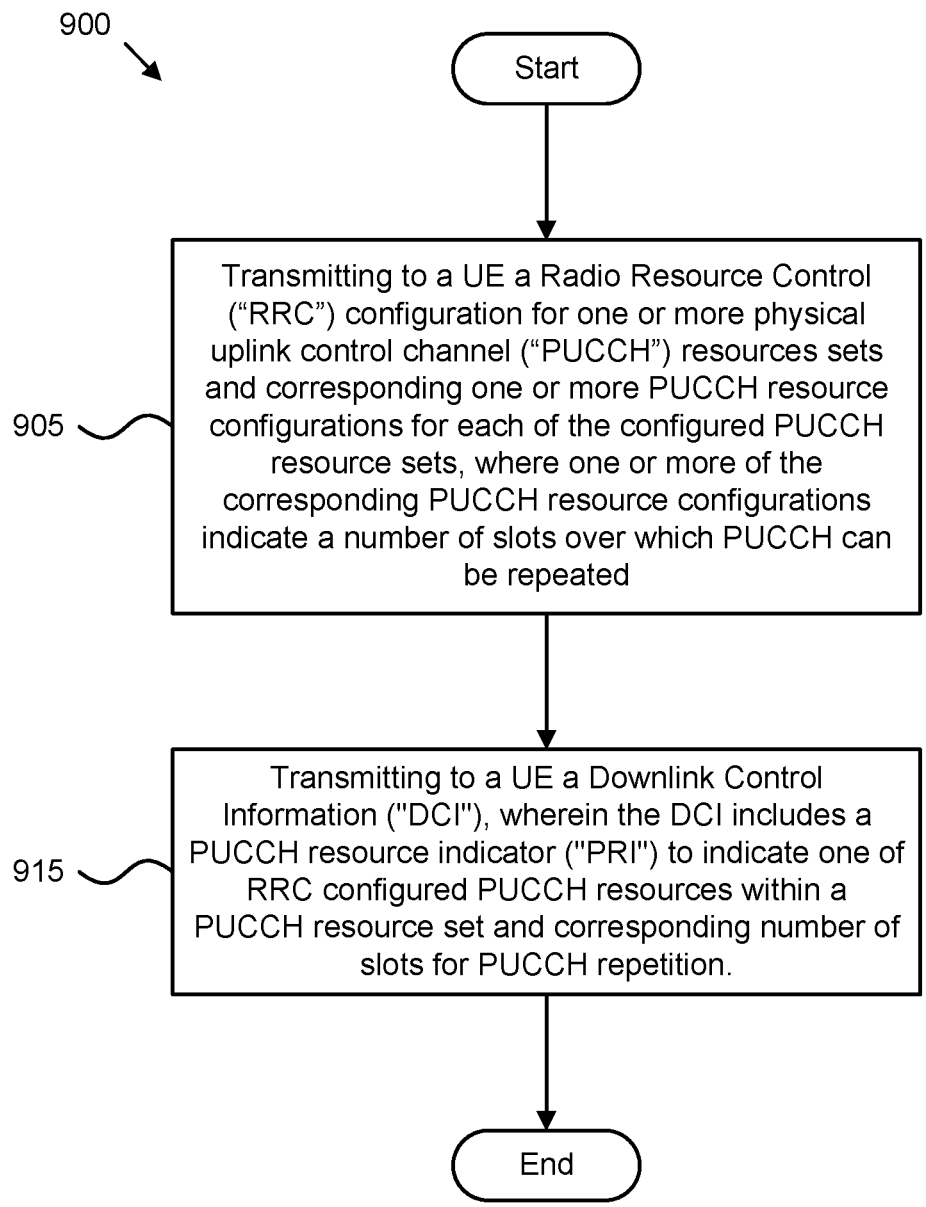
FIG. 9 is a flowchart diagram illustrating a network equipment method for enhanced UL repetition indication and repetition procedure for coverage, in accordance with one or more examples of the present disclosure.

FIG. 9 is a flowchart diagram of a network equipment method 900 for enhanced UL repetition indication and repetition procedure for coverage. In various embodiments, the method 900 begins and includes transmitting to a User Equipment ("UE") a Radio Resource Control ("RRC") configuration for one or more physical uplink control channel ("PUCCH") resources sets and corresponding one or more PUCCH resource configurations for each of the configured PUCCH resource sets, where one or more of the corresponding PUCCH resource configurations indicate a number of slots over which PUCCH can be repeated and transmitting a downlink control information ("DCI"), where the DCI includes a PUCCH resource indicator ("PRI") to indicate one of a RRC configured PUCCH resources within a PUCCH resource set and a corresponding number of slots for PUCCH repetition.

The method 900 may be performed by a communication device as described herein, for example, the base unit 121, the Radio Access Network 120, or the network equipment apparatus 600. In some examples, the method 900 may be performed by a processor executing program code, for example, a microcontroller, a microprocessor, a CPU, a GPU, an auxiliary processing unit, a FPGA, or the like.

[[Claim Statements]]

Referring again to one example of the first solution described above for configuration/indication of different categories of PUSCH repetition Type A, the following example methods are disclosed.

A method of a User Equipment ("UE") includes, in various examples, receiving a configuration from a network for repetition of physical channel, where the configuration indicates at least the first value for number of repetitions R1, time-domain resource allocation for each of the repetitions and at least two repetition methods. The method further includes receiving a configuration from the network of at least a second value for number of repetitions R2 and determining at least one of the repetition methods based on the comparison between the first value for number of repetitions R1 and second value for number of repetitions R2, wherein a first repetition method is selected for transmission if the first value for number of repetitions R1 is greater than the second value for number of repetitions R2, otherwise a second repetition method is selected for transmission.

In certain examples, the UE is configured with two repetition methods for PUSCH repetition, where the first repetition method is PUSCH repetition type A and the second repetition method is enhanced PUSCH repetition type A, where PUSCH repetition type A indicates that the actual number of repetitions are transmitted based on the number of available UL slots within the consecutive R1 slots and enhanced PUSCH repetition type A indicates that the actual number of repetitions are transmitted on R1 uplink slots available for transmission. In some examples, the second value for number of repetitions R2 is semi-statically or pre-configured to be 16, the method further including applying PUSCH repetition type A for transmitting PUSCH repetitions if the first value for number of repetitions R1 is greater than 16, otherwise if the first value for number of repetitions R1 is less than or equal to 16, then enhanced PUSCH repetition type A is applied for transmitting PUSCH repetitions.

In some examples, the first value for number of repetitions R1 indicates a required number of available slots for transmission and wherein the second value for number of repetitions R2 indicates repetition span, wherein R2 represents the maximum duration beyond which the repetitions are not allowed to be transmitted regardless of whether all R1 repetitions are transmitted or not. In certain examples the first value for number of repetitions R1 indicates number of slots for transmission and wherein the second value for number of repetitions R2 indicates repetition span, wherein R2 represents the maximum duration beyond which the repetitions are not allowed to be transmitted regardless of whether all R1 repetitions are transmitted or not.

In various examples, the first value for number of repetitions R1 is smaller than or equal to the second value for number of repetitions R2., in one or more examples, the first value for number of repetitions R1 is semi-statically configured by RRC signaling and the second value for number of repetitions R2 is indicated by a time-domain resource allocation table. In certain examples, both the first value for number of repetitions R1 and the second value for number of repetitions R2 are indicated by a time-domain resource allocation table.

In certain examples, the method includes applying enhanced PUSCH repetition type A for repetitions when both the first value for number of repetitions R1 and the second value for number of repetitions R2 are indicated by time-domain resource allocation table.

Such example methods may be performed in connection with or as variations of method 700 described above with respect to FIG. 7.

Similarly with respect to various embodiments of the first solution, one or more apparatuses may perform the disclosed methods.

A User Equipment ("UE") apparatus for enhanced UL repetition indication and repetition procedure for coverage is disclosed. The apparatus includes a transceiver and a processor that receives a configuration from a network for repetition of physical channel, where the configuration indicates at least the first value for number of repetitions R1, time-domain resource allocation for each of the repetitions and at least two repetition methods. The processor further receives a configuration from the network of at least a second value for number of repetitions R2; wherein a first repetition method for transmission is selected in response to the first value for number of repetitions R1 being greater than the second value for number of repetitions R2, otherwise a second repetition method is selected for transmission.

In certain examples, the UE is configured with two repetition methods for PUSCH repetition, where the first repetition method is PUSCH repetition type A and the second repetition method is enhanced PUSCH repetition type A, where PUSCH repetition type A indicates that the actual number of repetitions are transmitted based on the number of available UL slots within the consecutive R1 slots and enhanced PUSCH repetition type A indicates that the actual number of repetitions are transmitted on R1 uplink slots available for transmission. In some examples, the second value for number of repetitions R2 is semi-statically or pre-configured to be 16, the method further including applying PUSCH repetition type A for transmitting PUSCH repetitions if the first value for number of repetitions R1 is greater than 16, otherwise if the first value for number of repetitions R1 is less than or equal to 16, then enhanced PUSCH repetition type A is applied for transmitting PUSCH repetitions.

In some examples, the first value for number of repetitions R1 indicates a required number of available slots for transmission and wherein the second value for number of repetitions R2 indicates repetition span, wherein R2 represents the maximum duration beyond which the repetitions are not allowed to be transmitted regardless of whether all R1 repetitions are transmitted or not. In certain examples the first value for number of repetitions R1 indicates number of slots for transmission and wherein the second value for number of repetitions R2 indicates repetition span, wherein R2 represents the maximum duration beyond which the repetitions are not allowed to be transmitted regardless of whether all R1 repetitions are transmitted or not.

In various examples, the first value for number of repetitions R1 is smaller than or equal to the second value for number of repetitions R2., in one or more examples, the first value for number of repetitions R1 is semi-statically configured by RRC signaling and the second value for number of repetitions R2 is indicated by a time-domain resource allocation table. In certain examples, both the first value for number of repetitions R1 and the second value for number of repetitions R2 are indicated by a time-domain resource allocation table.

In certain examples, the processor applies enhanced PUSCH repetition type A for repetitions when both the first value for number of repetitions R1 and the second value for number of repetitions R2 are indicated by time-domain resource allocation table.

A Radio Access Network ("RAN") apparatus for enhanced UL repetition indication and repetition procedure for coverage is disclosed. The apparatus includes a transceiver and a processor that transmits a configuration to a User Equipment ("UE") for repetition of physical channel, where the configuration indicates at least the first value for number of repetitions R1, time-domain resource allocation for each of the repetitions and at least two repetition methods. The transceiver further transmits a configuration to the UE of at least a second value for number of repetitions R2, wherein a first repetition method of the at least two repetition methods is selected for transmission in response to the first value for number of repetitions R1 being greater than the second value for number of repetitions R2, otherwise a second repetition method is selected for transmission.

In certain examples, the configuration for the at least two repetition methods for PUSCH repetition, where the first repetition method is PUSCH repetition type A and the second repetition method is enhanced PUSCH repetition type A, where PUSCH repetition type A indicates that the actual number of repetitions are transmitted based on the number of available UL slots within the consecutive R1 slots and enhanced PUSCH repetition type A indicates that the actual number of repetitions are transmitted on R1 uplink slots available for transmission. In some examples, the second value for number of repetitions R2 is semi-statically or pre-configured to be 16, the method further including applying PUSCH repetition type A for transmitting PUSCH repetitions if the first value for number of repetitions R1 is greater than 16, otherwise if the first value for number of repetitions R1 is less than or equal to 16, then enhanced PUSCH repetition type A is applied for transmitting PUSCH repetitions.

In some examples, the first value for number of repetitions R1 indicates a required number of available slots for transmission and wherein the second value for number of repetitions R2 indicates repetition span, wherein R2 represents the maximum duration beyond which the repetitions are not allowed to be transmitted regardless of whether all R1 repetitions are transmitted or not. In certain examples the first value for number of repetitions R1 indicates number of slots for transmission and wherein the second value for number of repetitions R2 indicates repetition span, wherein R2 represents the maximum duration beyond which the repetitions are not allowed to be transmitted regardless of whether all R1 repetitions are transmitted or not.

In various examples, the first value for number of repetitions R1 is smaller than or equal to the second value for number of repetitions R2., in one or more examples, the first value for number of repetitions R1 is semi-statically configured by RRC signaling and the second value for number of repetitions R2 is indicated by a time-domain resource allocation table. In certain examples, both the first value for number of repetitions R1 and the second value for number of repetitions R2 are indicated by a time-domain resource allocation table.

In certain examples, the configuration includes enhanced PUSCH repetition type A for repetitions when both the first value for number of repetitions R1 and the second value for number of repetitions R2 are indicated by time-domain resource allocation table.

Referring again to embodiments of the third solution directed to PUCCH repetition indication), A method of a User Equipment ("UE") includes receiving from a network a Radio Resource Control ("RRC") configuration for one or more physical uplink control channel ("PUCCH") resources sets and corresponding one or more PUCCH resource configurations for each of the configured PUCCH resource sets, wherein one or more of the corresponding PUCCH resource configurations indicate a number of slots over which a PUCCH transmission can be repeated and receiving from the network a downlink control information ("DCI"), wherein the DCI includes a PUCCH resource indicator ("PRI") to indicate one of a RRC configured PUCCH resources within a PUCCH resource set and a corresponding number of slots for PUCCH repetition.

In some embodiments, the method includes performing a PUCCH transmission that includes a number of repetitions less than or equal to the number of slots for PUCCH repetition for the indicated PUCCH resource in a PUCCH resource indicator table. In various embodiments, for each of the one or more PUCCH resource sets, the number of slots for PUCCH repetition for each of the configured PUCCH resources is independently configured for the corresponding PUCCH resource indicator table. In one or more embodiments, the number of slots for PUCCH repetitions for each of the one or more PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set. In various embodiments, a range of the number of slots for PUCCH repetitions for each of the one or more PUCCH resource sets is independently configurable based on: a PUCCH format that is associated with the PUCCH resource set, a payload size; and combinations thereof.

A User Equipment apparatus includes a transceiver and a processor that receives from a network a Radio Resource Control ("RRC") configuration for one or more physical uplink control channel ("PUCCH") resources sets and corresponding one or more PUCCH resource configurations for each of the configured PUCCH resource sets, wherein one or more of the corresponding PUCCH resource configurations indicate a number of slots over which PUCCH can be repeated and receives from the network a downlink control information ("DCI"), wherein the DCI includes a PUCCH resource indicator ("PRI") to indicate one of a RRC configured PUCCH resources within a PUCCH resource set and a corresponding number of slots for PUCCH repetition.

In various embodiments, the processor further performs a PUCCH transmission that includes a number of repetitions less than or equal to the number of slots for PUCCH repetition for the indicated PUCCH resource in a PUCCH resource indicator table. In some embodiments, for each of the one or more PUCCH resource sets, the number of slots for PUCCH repetition for each of the configured PUCCH resources is independently configured for the corresponding PUCCH resource indicator table. In certain embodiments, a range of the number of slots for PUCCH repetitions for each of the one or more PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set. In some embodiments, a range of the number of slots for PUCCH repetitions for each of the one or more PUCCH resource sets is independently configurable based on a PUCCH format that is associated with the PUCCH resource set, a payload size; and combinations thereof.

A Radio Access Network ("RAN") apparatus includes a transceiver and a processor that transmits to a User Equipment ("UE") a Radio Resource Control ("RRC") configuration for one or more physical uplink control channel ("PUCCH") resources sets and corresponding one or more PUCCH resource configurations for each of the configured PUCCH resource sets, wherein one or more of the corresponding PUCCH resource configurations indicate a number of slots over which PUCCH can be repeated and transmits a downlink control information ("DCI"), wherein the DCI includes a PUCCH resource indicator ("PRI") to indicate one of a RRC configured PUCCH resources within a PUCCH resource set and a corresponding number of slots for PUCCH repetition.

In some embodiments, the processor receives a PUCCH transmission that includes a number of repetitions less than or equal to the number of slots for PUCCH repetition for the indicated PUCCH resource in a PUCCH resource indicator table. In various embodiments, for each of the one or more PUCCH resource sets, the number of slots for PUCCH repetition for each of the configured PUCCH resources is independently configured for the corresponding PUCCH resource indicator table. In certain embodiments, a range of the number of slots for PUCCH repetitions for each of the one or more PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set. In some embodiments, a range of the number of slots for PUCCH repetitions for each of the one or more PUCCH resource sets is independently configurable based on: a PUCCH format that is associated with the PUCCH resource set, a payload size; and combinations thereof.

Examples may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a User Equipment ("UE"), the method comprising:
   receiving a Radio Resource Control ("RRC") configuration for a plurality of physical uplink control channel ("PUCCH") resources sets and a corresponding PUCCH resource configuration for each of the plurality of configured PUCCH resource sets, wherein one or more PUCCH resource configurations indicate a maximum number of slots for repeating a PUCCH transmission; and
   receiving a downlink control information ("DCI") comprising a PUCCH resource indicator ("PRI") that indicates one of a RRC configured PUCCH resource within a respective PUCCH resource set and a corresponding quantity of slots for PUCCH repetition, wherein the corresponding quantity of slots is based on the one or more PUCCH resource configurations.

2. The method of claim 1, further comprising performing a PUCCH transmission that includes a number of repetitions less than or equal to the quantity of slots for PUCCH repetition for the indicated PUCCH resource in a PUCCH resource indicator table.

3. The method of claim 1, wherein for each of the plurality of PUCCH resource sets, the quantity of slots for PUCCH repetition for each of the configured PUCCH resources is independently configured for the corresponding PUCCH resource indicator table.

4. The method of claim 1, wherein the quantity of slots for PUCCH repetitions for each of the plurality of PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set.

5. The method of claim 1, wherein a range of the maximum number of slots for repeating a PUCCH transmission for each of the plurality of PUCCH resource sets is independently configurable based on: a PUCCH format that is associated with the PUCCH resource set, a payload size; and
combinations thereof.

6. A User Equipment (UE), comprising:
at least one memory; and
at least one processor coupled with the at least one memory and configured to cause the UE to:
receive a Radio Resource Control ("RRC") configuration for a plurality of physical uplink control channel ("PUCCH") resources sets and a corresponding PUCCH resource configuration for each of the plurality of configured PUCCH resource sets, wherein one or more PUCCH resource configurations indicate a maximum number of slots for repeating a PUCCH transmission; and
receive a downlink control information ("DCI") comprising a PUCCH resource indicator ("PRI") that indicates a RRC configured PUCCH resource within a respective PUCCH resource set and a corresponding quantity of slots for PUCCH repetition, wherein the corresponding quantity of slots is based on the one or more PUCCH resource configurations.

7. The UE of claim 6, wherein the at least one processor is configured to cause the UE to perform a PUCCH transmission that includes a number of repetitions less than or equal to the quantity of slots for PUCCH repetition for the indicated PUCCH resource in a PUCCH resource indicator table.

8. The UE of claim 6, wherein for each of the plurality of PUCCH resource sets, the quantity of slots for PUCCH repetition for each of the configured PUCCH resources is independently configured for the corresponding PUCCH resource indicator table.

9. The UE of claim 6, wherein a range of the maximum number of slots for repeating a PUCCH transmission for each of the plurality of PUCCH resource sets is independently configurable based on: the PUCCH format that is associated with the PUCCH resource set, the PUCCH resources within the set; or both the PUCCH format that associated with the PUCCH resource set and the PUCCH resources within the PUCCH resource set.

10. The UE of claim 6, wherein a range of the maximum number of slots for repeating a PUCCH transmission for each of the plurality of PUCCH resource sets is independently configurable based on: a PUCCH format that is associated with the PUCCH resource set, a payload size; and combinations thereof.

11. A base station, comprising:
at least one memory; and
at least one processor coupled with the at least one memory and configured to cause the base station to:
transmit a Radio Resource Control ("RRC") configuration for a plurality of physical uplink control channel ("PUCCH") resources sets and a corresponding PUCCH resource configuration for each of the plurality of configured PUCCH resource sets, wherein one or more PUCCH resource configurations indicate a maximum number of slots for repeating a PUCCH transmission; and
transmit a downlink control information ("DCI") comprising a PUCCH resource indicator ("PRI") that indicates a RRC configured PUCCH resource within a respective PUCCH resource set and a corresponding quantity of slots for PUCCH repetition, wherein the corresponding quantity of slots is based on the one or more PUCCH resource configurations.

12. The base station of claim 11, wherein the at least one processor receives a PUCCH transmission that includes a number of repetitions less than or equal to the quantity of slots for PUCCH repetition for the indicated PUCCH resource in a PUCCH resource indicator table.

13. The base station of claim 11, wherein for each of the plurality of PUCCH resource sets, the maximum number of slots for PUCCH repetition for each of the configured PUCCH resources is independently configured for the corresponding PUCCH resource indicator table.

14. The base station of claim 11, wherein the quantity of slots for PUCCH repetitions for each of the plurality of PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set.

15. The base station of claim 11, wherein a range of the maximum number of slots for repeating PUCCH transmission for each of the plurality of PUCCH resource sets is independently configurable based on: a PUCCH format that is associated with the PUCCH resource set, a payload size; and combinations thereof.

16. A method performed by a base station, the method comprising:
transmitting a Radio Resource Control ("RRC") configuration for a plurality of physical uplink control channel ("PUCCH") resources sets and a corresponding PUCCH resource configuration for each of the plurality of configured PUCCH resource sets, wherein one or more PUCCH resource configurations indicate a maximum number of slots for repeating a PUCCH; and
transmitting a downlink control information ("DCI") comprising a PUCCH resource indicator ("PRI") that indicates a RRC configured PUCCH resource within a respective PUCCH resource set and a corresponding quantity of slots for PUCCH repetition, wherein the corresponding quantity of slots is based on the one or more PUCCH resource configurations.

17. The method of claim 16, further comprising receiving a PUCCH transmission that includes a number of repetitions less than or equal to the quantity of slots for PUCCH repetition for the indicated PUCCH resource in a PUCCH resource indicator table.

18. The method of claim 16, wherein for each of the plurality of PUCCH resource sets, the maximum number of slots for PUCCH repetition for each of the configured PUCCH resources is independently configured for the corresponding PUCCH resource indicator table.

19. The method of claim 16, wherein the quantity of slots for PUCCH repetitions for each of the plurality of PUCCH resource sets is independently configured based on: the PUCCH format that is associated with the PUCCH resource set, the PUCCH resources within the set; or both the PUCCH format that associated with the PUCCH resource set and the PUCCH resources within the PUCCH resource set.

20. The method of claim 16, wherein a range of the maximum number of slots for repeating PUCCH transmission for each of the plurality of PUCCH resource sets is independently configurable based on: a PUCCH format that is associated with the PUCCH resource set, a payload size; and combinations thereof.

* * * * *